(12) United States Patent
Watanabe et al.

(10) Patent No.: US 11,153,107 B2
(45) Date of Patent: Oct. 19, 2021

(54) COMMUNICATION APPARATUS, COMMUNICATION METHOD, COMMUNICATION SYSTEM, AND NODE APPARATUS

(71) Applicant: FUJITSU LIMITED, Kawasaki (JP)

(72) Inventors: Kimio Watanabe, Kawasaki (JP); Masaaki Takase, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/108,794

(22) Filed: Aug. 22, 2018

(65) Prior Publication Data

US 2018/0367322 A1 Dec. 20, 2018

Related U.S. Application Data

(63) Continuation of application No. PCT/JP2016/056104, filed on Feb. 29, 2016.

(51) Int. Cl.
*H04L 12/14* (2006.01)
*H04L 12/24* (2006.01)
(Continued)

(52) U.S. Cl.
CPC ...... *H04L 12/1407* (2013.01); *H04L 12/1403* (2013.01); *H04L 41/0893* (2013.01);
(Continued)

(58) Field of Classification Search
CPC ............... H04L 12/1407; H04L 47/627; H04L 41/0893; H04L 47/20; H04L 12/1403;
(Continued)

(56) References Cited

U.S. PATENT DOCUMENTS

2002/0114280 A1* 8/2002 Yi .................. H04B 7/2612
370/235
2014/0321288 A1* 10/2014 Ha ................. H04W 28/0268
370/237
(Continued)

FOREIGN PATENT DOCUMENTS

| CN | 102137381 A | 7/2011 |
| JP | 2015-228602 A | 12/2015 |
| WO | WO-2013113387 A1 * | 8/2013 |

OTHER PUBLICATIONS

3GPP TS 23.203 V13.6.0, "3rd Generation Partnership Project; Technical Specification Group Services and System Aspects; Policy and charging control architecture (Release 13)", Dec. 2015.
(Continued)

*Primary Examiner* — Minjung Kim
(74) *Attorney, Agent, or Firm* — Myers Wolin, LLC

(57) ABSTRACT

A communication apparatus includes: a monitor configured to monitor a first communication amount in first communication between a first communication apparatus and a terminal apparatus and/or a second communication amount in second communication between a second communication apparatus and the terminal apparatus, the second communication apparatus performs communication with the terminal apparatus; and a transmitter configured to transmit information relating to monitoring result by the monitor to a communication control apparatus that is able to perform policy control and charging control.

4 Claims, 35 Drawing Sheets

(51) Int. Cl.
- *H04W 92/12* (2009.01)
- *H04L 12/863* (2013.01)
- *H04L 12/813* (2013.01)
- *H04W 4/24* (2018.01)
- *H04W 88/14* (2009.01)
- *H04W 92/20* (2009.01)
- *H04W 88/18* (2009.01)
- *H04W 88/08* (2009.01)
- *H04M 15/00* (2006.01)

(52) U.S. Cl.
CPC ............ *H04L 47/20* (2013.01); *H04L 47/627* (2013.01); *H04M 15/00* (2013.01); *H04M 15/31* (2013.01); *H04M 15/66* (2013.01); *H04M 15/8033* (2013.01); *H04M 15/854* (2013.01); *H04W 4/24* (2013.01); *H04W 88/08* (2013.01); *H04W 88/14* (2013.01); *H04W 88/18* (2013.01); *H04W 92/12* (2013.01); *H04W 92/20* (2013.01)

(58) Field of Classification Search
CPC ........... H04M 15/854; H04M 15/8033; H04M 15/31; H04M 15/00; H04M 15/66; H04W 4/24; H04W 88/08; H04W 92/20; H04W 92/12; H04W 88/18; H04W 88/14
See application file for complete search history.

(56) References Cited

U.S. PATENT DOCUMENTS

| | | | |
|---|---|---|---|
| 2015/0133081 A1* | 5/2015 | Griot | H04L 12/1435 455/407 |
| 2015/0195858 A1 | 7/2015 | Jin et al. | |
| 2015/0288828 A1* | 10/2015 | Lim | H04M 15/41 455/408 |
| 2018/0077294 A1* | 3/2018 | Rasanen | H04L 12/1407 |

OTHER PUBLICATIONS

"Mobile-Edge Computing", Mobile-Edge Computing-Introductory Technical White Paper, ETSI, Sep. 2014.

Qualcomm Incorporated et al., Change Request for "Differentiated charging of traffic when using unlicensed spectrum", 3GPP TSG-SA WG1 Meeting #72, S1-154136, Anaheim, USA, Nov. 16-20, 2015.

Hu et al., "Mobile Edge Computing a Key technology towards 5G", ETSI White Paper No. 11, [online], ETSI, Sep. 2015, pp. 1-16.

Huawei et al., "Support new services such as Routing optimization when server changes", Agenda Item: 8.1, 3GPP TSG-SA WG1 Meeting #71, S1-152756, Belgrade, Serbia, Aug. 17-21, 2015.

International Search Report issued by the Japan Patent Office for corresponding International Patent Application No. PCT/JP2016/056104, dated Mar. 22, 2016, with an English translation.

Written Opinion of the International Searching Authority issued by the Japan Patent Office for corresponding International Patent Application No. PCT/JP2016/056104, dated Mar. 22, 2016, with an English translation.

Extended European search report with supplementary European search report and the European search opinion issued by the European Patent Office for corresponding European Patent Application No. 16892460.3, dated Nov. 19, 2018.

Lucent Technologies: "MME/UPE relocation and Concepts of Service continuity and Optimal routing and local breakout", Agenda Item: 4.2, 3GPP TSG-SA WG2 Architecture—SAE Ad-Hoc, S2-062716, Sophia Antipolis, France, Aug. 23-25, 2006.

First Notification of Office Action issued by the China National Intellectual Property Administration for corresponding Chinese Patent Application No. 201680082747.3, dated May 26, 2020, with an English translation.

Second Notification of Office Action issued by the China National Intellectual Property Administration for corresponding Chinese Patent Application No. 201680082747.3, dated Oct. 22, 2020, with an English translation.

Communication pursuant to Article 94(3) EPC issued by the European Patent Office for corresponding European Patent Application No. 16 892 460.3-1212, dated Dec. 7, 2020.

\* cited by examiner

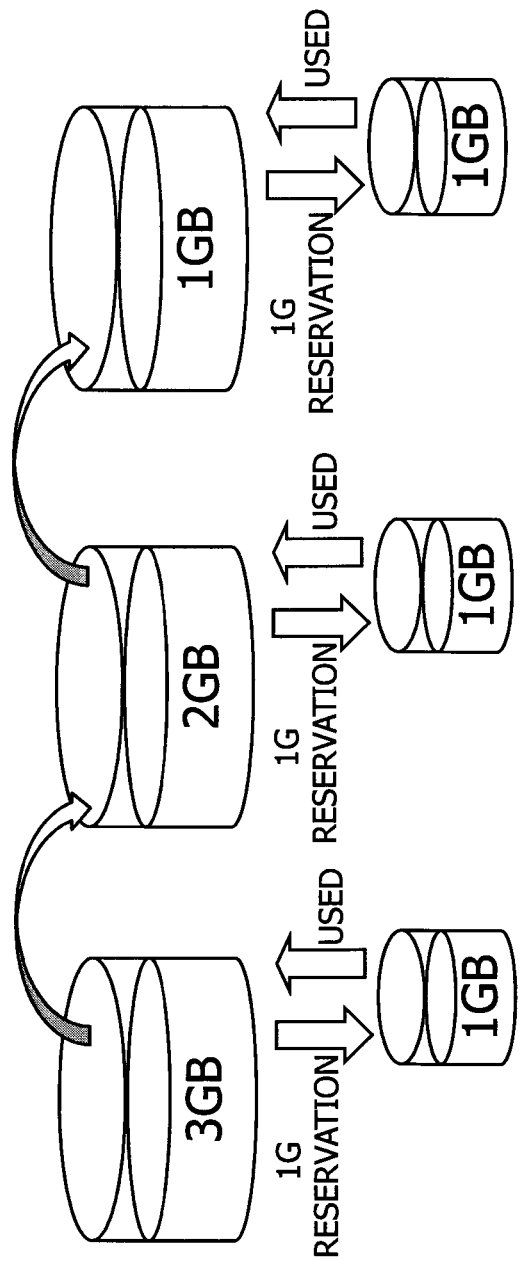
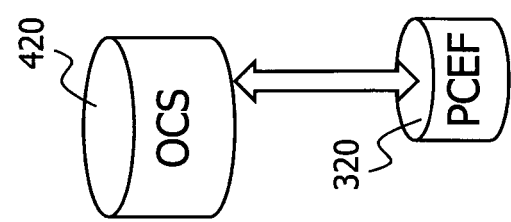

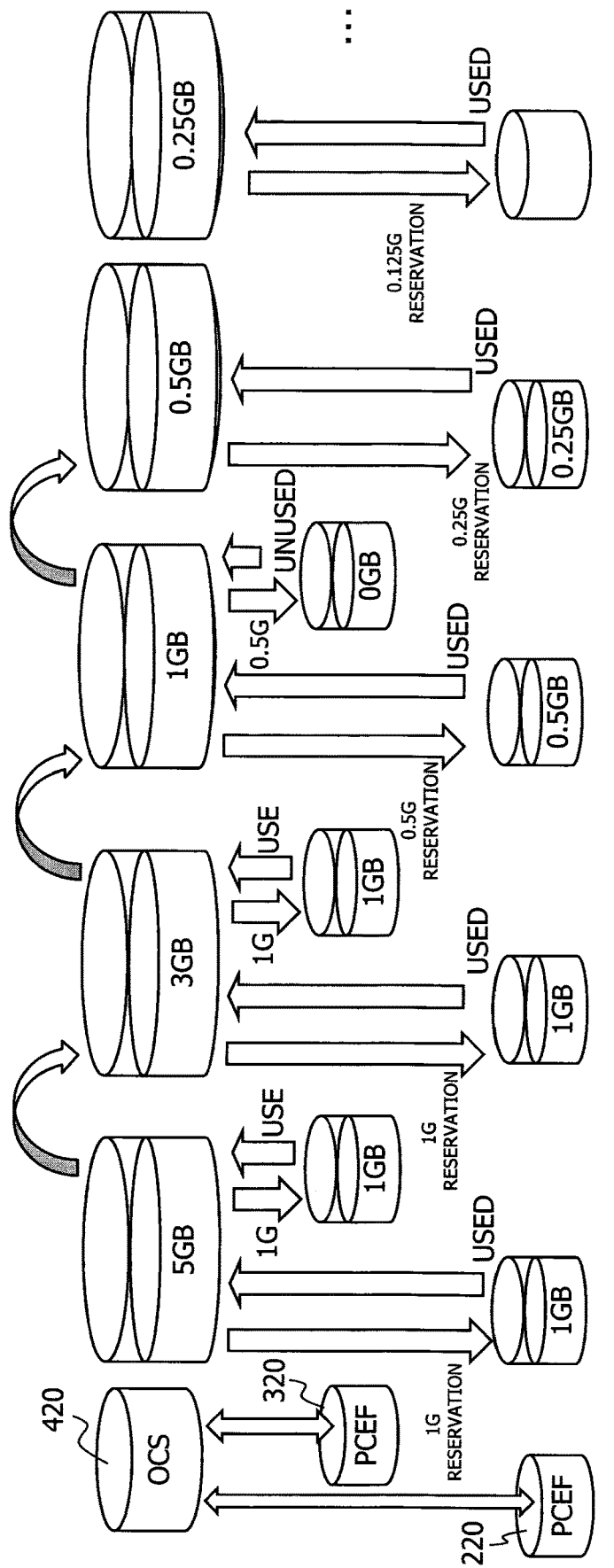

US 11,153,107 B2

COMMUNICATION APPARATUS, COMMUNICATION METHOD, COMMUNICATION SYSTEM, AND NODE APPARATUS

CROSS-REFERENCE TO RELATED APPLICATION

This application is a continuation application of International Application PCT/JP2016/056104 filed on Feb. 29, 2016 and designated the U.S., the entire contents of which are incorporated herein by reference.

FIELD

The embodiments discussed herein are related to a communication apparatus, a communication method, a communication system, and a node apparatus.

BACKGROUND

At present, in the 3GPP (3rd Generation Partnership Project), a standardization association, a succeeding system of LTE (Long Term Evolution) and LTE-Advanced is being studied. Such a system is called as the 5th generation mobile communication (5G). In Japan also, a service using CA (Carrier Aggregation), which is one of the LTE-Advanced techniques, has really been introduced since 2015, enabling radio communication with a transmission speed higher than 200 Mbps.

In the LTE system and the LTE-Advanced system, PCC (Policy and Charging Control) may be applied. PCC is, for example, an advanced tool for service-conscious QoS (Quality of Service) and charging control. As functional entities included in PCC, there are PCRF (Policy and Charging Rules Function), PCEF (Policy and Charging Enforcement Function), OCS (Online Charging System) and so on.

PCRF includes, for example, a policy control decision function and a flow-based charging control function, so as to provide service data flow detection, gating, QoS, flow-based charging, etc. Further, PCEF includes, for example, the detection function of a service data flow, a policy enforcement function and a flow-based charging function, so as to provide the detection of a service data flow, the handling of user plane traffic, etc. Further, OCS executes, for example, an online credit control function to perform credit control for each charging criterion.

Meanwhile, there is also a mobile-edge computing technique. Mobile-edge computing is a technique of, for example, installing a server in the vicinity of a base station to provide a service from the server to a terminal apparatus. The mobile edge computing enables the reduction of a transmission delay (Latency) and response improvement in comparison with a case when a server is connected through a core network, and further enables the reduction of a load on the core network side.

CITATION LIST

Non-Patent Literature

[Non-patent literature 1] 3GPP TS 23.203 V13.6.0 (2015-12) [Non-patent literature 2] "Mobile-Edge Computing", Mobile-Edge Computing-Introductory Technical White Paper, ETSI, September 2014

SUMMARY

According to an aspect of the embodiments, a communication apparatus includes: a monitor configured to monitor a first communication amount in first communication between a first communication apparatus and a terminal apparatus and/or a second communication amount in second communication between a second communication apparatus and the terminal apparatus, the second communication apparatus performs communication with the terminal apparatus; and a transmitter configured to transmit information relating to monitoring result by the monitor to a communication control apparatus that is able to perform policy control and charging control.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4A-4D are diagrams illustrating examples of modeling a data usage.

FIGS. 5A-5F are diagrams illustrating examples of modeling a data usage.

DESCRIPTION OF EMBODIMENTS

Hereinafter, the present embodiments will be described in detail by reference to the drawings. However, the problem and the embodiments in the present description are examples, and are not intended to restrict the scope of right of the present application. In particular, even if the expression of the description is different, the technique of the present application is applicable without limiting the scope of right if being technically equivalent. Further, each embodiment may appropriately be combined within the range of not producing contradiction among the processing contents.

Also, as to terms used in the present description and described technical contents, the terms and the technical contents in the specifications of 3GPP etc., which are described as standards related to communication, may appropriately be applicable. Examples of such specifications include non-patent literature 1 and 2 described above and the like.

First Embodiment

Figure 1:
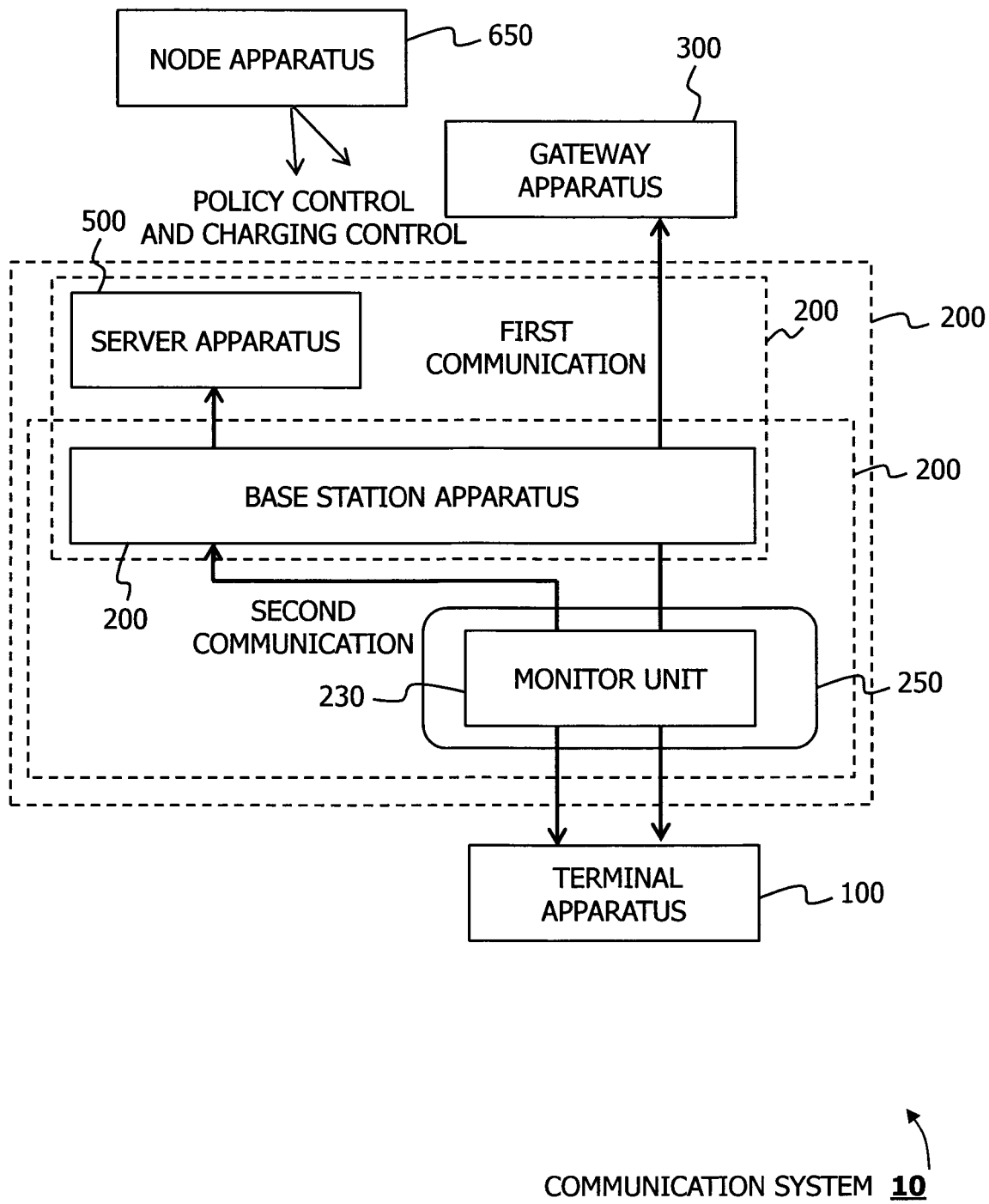
FIG. 1 is a diagram illustrating a configuration example of a communication system.

FIG. 1 is a diagram illustrating a configuration example of a communication system 10 according to a first embodiment. The communication system 10 includes a terminal apparatus 100, a base station apparatus 200, a gateway apparatus 300, a server apparatus 500, a node apparatus 650, and a communication apparatus 250.

The base station apparatus 200 performs radio communication with the terminal apparatus 200. The gateway apparatus 300 is included in a core network.

The server apparatus 500 may be connected to the base station apparatus 200, or may be provided inside the base station apparatus 200. Further, the server apparatus 500 is, for example, an application server which provides edge computing.

The node apparatus 650 performs policy control and charging control.

The communication apparatus 250 includes a monitor unit 230. The monitor unit 230 transmits to the node apparatus 650 each monitoring result to a first communication amount in first communication and a second communication amount in second communication. Here, the first communication is communication between the gateway apparatus 300 and the terminal apparatus 100, for example. Also, the second communication is communication between the server apparatus 500 and the terminal apparatus 100 or between the base station apparatuses 200 which includes the server apparatus 500 and the terminal apparatus 100, for example.

As such, the node apparatus 650 can acquire the monitoring result to the first communication amount of the first communication and the second communication amount of the second communication, so that can acquire the monitoring result of overall communication, not only the first communication. As an example of such a monitoring result, there is a total communication amount obtained by totaling the first communication amount and the second communication amount, for example.

Further, in the node apparatus 650, based on a value which indicates the monitoring result of the overall communication, it is also possible to perform policy control and charging control on the first communication and the second communication of the terminal apparatus 100, or perform policy control and charging control on the second communication without performing on the first communication.

Also, the node apparatus 650 may receive a value which indicates the monitoring result from the monitor unit 230, so that can perform policy control and charging control on the two types of communication. Because the node apparatus 650 receives from the monitor unit 230 the value indicative of the monitoring result without receiving other signals, the number of signals (or a signal amount) can be reduced in comparison with a case when a variety of signals are received from the monitor unit 230.

Thus, in the present communication system 10, for example, it is possible to efficiently perform the policy control and the charging control in a mobile-edge computing environment.

Additionally, as depicted with a dotted line in FIG. 1 for example, the communication apparatus 250 may be provided inside the base station apparatus 200 or the communication apparatus 250 itself may be the base station apparatus 200. Also, as depicted with a dotted line in FIG. 1, the server apparatus 500 may be included in the base station apparatus 200, or the communication apparatus 250 and the server apparatus 500 may be included in the base station apparatus 200.

Second Embodiment

Next, a second embodiment will be described. First, terms described in the second embodiment will be described.

Description of Terms

PCC signifies a function or an apparatus which performs policy control and charging control, for example. A part of functional entities (or functional elements) included in the PCC has been described above. In the PCC, there are also included functional entities like TDF (Traffic Detection Function), SPR (Subscription Profile Repository), AF (Application Function), etc.

TDF, for example, detects an application to report the detected application and the service data flow thereof to PCRF. Also, the TDF performs redirection, bandwidth restriction, charging, etc., for example. SPR includes, for example, information related to entire subscribers/subscription needed for a subscription-based policy and a PCC rule of an IP-CAN (Internet Protocol connectivity access network) level. AF provides, for example, an application needed for dynamic policy and/or charging control.

The above functional entities included in the PCC may be executed in an apparatus such as a server apparatus, a node apparatus and a gateway apparatus. In this case, entire functional entities included in the PCC may be executed in one apparatus, or entire functional entities may be executed across a plurality of apparatuses. For example, the PCRF, the OCS, the SPR and the AF may be executed in a PCRF server, whereas the PCEF and the TDF may be executed in PGW (Packet Data Network Gateway). Alternatively, each of these functional entities may be executed in each individual apparatus. For example, the PCRF may be one apparatus, the PCEF may be another apparatus and the OCS may be yet another apparatus, and so on.

Policy control is a technique to perform communication control, such as QoS and propriety of packet transfer on the basis of subscriber (or user) information, for example. Also, charging control is a technique related to charging control, such as charging by counting a data amount etc. and checking whether or not to reach a contractual upper limit value and so on, on the basis of each user.

Core network signifies, for example, a network to which SGW (Serving Gateway), PGW, MME (Mobility Management Entity), PCRF server, etc. are connected. In some cases, the core network may be referred to as EPC (Evolved Packet Core), for example.

Core side PCC signifies an apparatus, such as a server apparatus and a node apparatus, or a function which executes all or a part of PCC functional entities in the core network, for example. The core side PCC may be included in an apparatus such as a gateway apparatus and a server apparatus connected to the core network, or may be executed in the above apparatuses as a function of PCC.

Bearer is, for example, an information transmission path including a determined capacity, a delay, a bit error rate, etc. EPS (Evolved Packet System) bearer in the core network is, for example, an information transmission path between a terminal and PGW.

Mobile-edge computing can be achieved, for example, by a server which is installed in the vicinity of a base station apparatus. Such a server may be called as an application server, for example. The application server may be directly connected to the base station apparatus or may be provided inside the base station apparatus, for example.

"Vicinity" of a base station apparatus signifies, for example, that a first distance between a terminal apparatus and an application server is within a threshold. For example, there is a case that another application server is connected to the radio communication system through the core network and a PDN (Packet Data Network). The "Vicinity" signifies that, in comparison with a second distance between the terminal apparatus and the other application server, the first distance is shorter than the second distance, for example.

Base station network signifies a network to which a base station apparatus, an application server, etc. are connected. There may be a case that each PCC function is also executed in the base station network.

Base station side PCC signifies an apparatus, such as a server apparatus or a node apparatus which executes all or a part of PCC functions, or a function in the base station network, for example. The base station side PCC may be included in an apparatus, such as the base station apparatus and the application server connected to the base station network, or another gateway apparatus and a server apparatus, or may be executed in the above apparatuses as a PCC function.

The above descriptions of terms are examples. As to these terms and phrases related to these terms, the terms and the signification thereof described in specifications specifying communication standards, such as 3GPP, and literature like a white paper related to a communication standard, may also be available.

Configuration Example of Communication System

Next, a configuration example of a communication system according to the second embodiment will be described. In the present second embodiment, there are four configuration examples of the communication system, which are a first configuration example to a fourth configuration example. First, these four configuration examples will be described, and thereafter, the details of the third configuration example and the fourth configuration example will be described.

Figure 2:
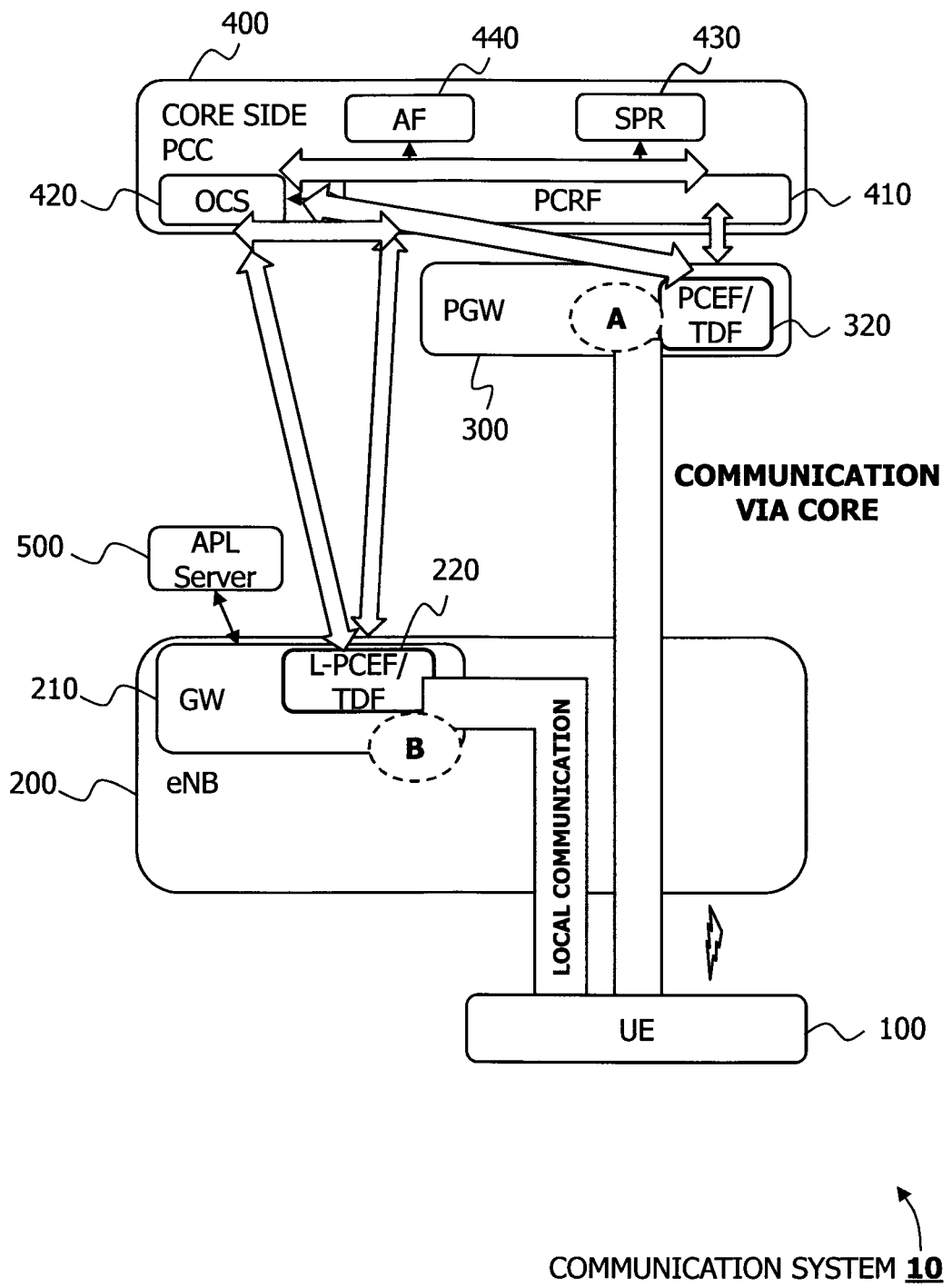
FIG. 2 is a diagram illustrating a configuration example of a communication system.

1. First Configuration Example to Fourth Configuration Example 1.1 Regarding the First Configuration Example FIG. 2 represents the first configuration example of the communication system 10. The communication system 10 includes UE (User Equipment: a mobile communication terminal or a terminal apparatus) 100, an eNB (evolved Node B: a base station apparatus) 200, a PGW 300 and a core side PCC 400. Also, the communication system 10 further includes an APL Server (Application Server. Hereafter, the APL Server may be referred to as an application server) 500. Here, in FIG. 2, the eNB 200 and the application server 500 are included in the base station network, whereas the PGW 300 and the core side PCC 400 are included in the core network.

For example, communication between the UE 100 and the GW 210 may be referred to as local communication, whereas communication between the UE 100 and the PGW 300 may be referred to as communication via core. Also, communication between the UE 100 and the application server 500 may be referred to as local communication.

The UE 100 is, for example, a radio communication apparatus, such as a feature phone, a smart phone, a personal computer, a game apparatus or the like, which performs radio communication with the eNB 200. The eNB 200 is, for example, a radio communication apparatus which performs radio communication with the UE 100 located in the cell range of the self-station to provide a variety of services, such as a speech communication service and a Web browsing service.

The eNB 200 includes, for example, a GW (Gateway) 210. The GW 210 is a gateway apparatus which is disposed between the eNB 200 and the application server 500 to connect the eNB 200 to the application server 500. The GW 210 may be disposed as an apparatus outside the eNB 200, for example.

The GW 210 is, for example, a gateway apparatus which establishes and terminates local communication. Specifically, the GW 210 sets a bearer related to local communication, for example. The details will be described in an operation example.

Further, the GW 210 either includes an L-PCEF/TDF (L-PCEF and L-TDF, or, L-PCEF or L-TDF) 220 or performs the function of the L-PCEF/TDF 220.

The L-PCEF/TDF 220, for example, executes policy control for local communication, counts a data amount, and so on. In this case, for example, the L-PCEF/TDF 220 exchanges messages etc. with a PCRF 410 and an OCS 420 which are disposed on the communication via core side, to execute policy determined in the PCRF 410 or count a data usage (or communication amount, which may hereafter be referred to as "data usage").

The PGW 300 is, for example, a gateway apparatus which connects the core network to an external network. The PGW 300 either includes a PCEF/TDF (PCEF and TDF, or, PCEF or TDF) 320, or executes the function of the PCEF/TDF. For example, the PGW 300 is also a node apparatus which establishes and terminates the communication via core.

The PCEF/TDF 320, for example, executes policy control for the communication via core, counts a data amount, and so on.

The core side PCC 400 is, for example, a node apparatus which performs policy control and charging control (or PCC control, which may hereafter be referred to as "PCC control"). The core side PCC 400 includes the PCRF 410, the OCS 420, an SPR 430 and an AF 440.

The PCRF 410 determines the policy to be applied to the communication via core, for example, to transmit the determined policy to the PCEF/TDF 320. Also, the PCRF 410 determines the policy to be applied to the local communication, for example, so as to transmit the determined policy to the L-PCEF/TDF 220.

The OCS 420, for example, instructs the PCEF/TDF 320 to apply a quota. Also, the OCS 420, for example, instructs the L-PCEF/TDF 220 to apply a quota.

The SPR 430, for example, manages subscriber information etc. Also, the AF 440, for example, provides an application related to dynamic policy and charging control.

The application server 500 is disposed, for example, in the vicinity of the eNB 200. The application server 500 is, for example, a server which provides mobile-edge computing. The application server 500 is disposed in the vicinity of the eNB 200. For example, the application server 500 is located in a position in which a distance between the UE 100 and the application server 500 is shorter than a distance between the UE 100 and the PGW 300. The application server 500 can provide the UE 100 with a variety of services, such as a Web browsing service and a video distribution service.

In the communication system 10 of the first configuration example, the following operation is performed, for example. Namely, the PCEF/TDF 320 receives the instruction of quota application to count a data amount of the communication via core, whereas the L-PCEF/TDF 220 receives the instruction of quota application to count a data amount of the local communication. In the example of FIG. 2, the PCEF/TDF 320 counts a data amount "A", whereas the L-PCEF/TDF 220 counts a data amount "B".

Then, the two PCEF/TDF 220, 320 transmit the counted "A" and "B" to the OCS 420, and the OCS 420 adds the two data amounts, so that can count a total data amount "A+B" of the two types of communication.

As such, in the first configuration example, for example, the L-PCEF/TDF 220 is provided in the eNB 200, so that PCC control may also be possible for the local communication by the mobile-edge computing. Therefore, in the communication system 10 according to the first configuration example, it is possible to efficiently perform policy control and charging control in the environment of the mobile-edge computing.

1.2 Second Configuration Example

Figure 3:
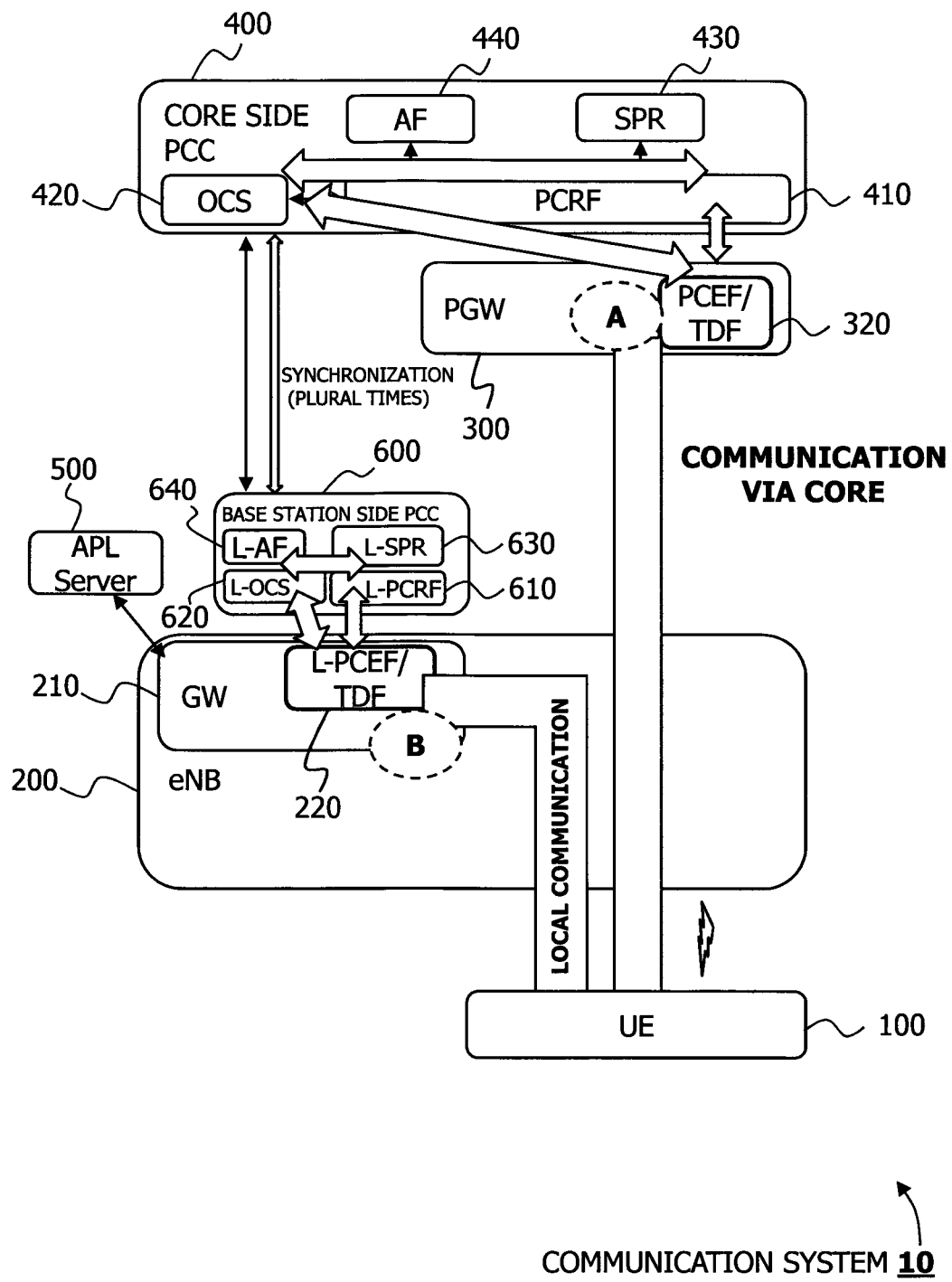
FIG. 3 is a diagram illustrating a configuration example of a communication system.

Next, a second configuration example will be described. FIG. 3 represents the second configuration example of the communication system 10.

The communication system 10 of the second configuration example further includes a base station side PCC 600. The base station side PCC 600 includes an L-PCRF 610, an L-OCS 620, an L-SPR 630 and an L-AF 640.

The base station side PCC 600, for example, is also a node apparatus which performs the PCC control for local communication. The base station side PCC 600 may be installed in the vicinity of the eNB 200 as a separate apparatus, or may be provided inside the eNB 200. An example in which the base station side PCC 600 is provided inside the eNB 200 will be described in a third embodiment.

For example, the L-PCRF 610 determines policy to be applied to the local communication, to instruct the L-PCEF/TDF 220 to apply the determined policy. Also, the L-OCS 620 performs an online credit control function for the local communication, to instruct a quota to be applied to the local communication to the L-PCEF/TDF 220. Further, the L-SPR 630 manages, for example, information related to subscriber information in regard to the local communication. Furthermore, the L-AF 640 provides an application related to dynamic policy and charging control for local communication.

In this case, the base station side PCC 600 performs the PCC control for local communication in synchronization with the core side PCC 400. This is because, in some cases, both the local communication and the communication via core may be considered on the policy control and the charging control for the UE 100.

In the communication system 10 in the second configuration example, the following operation is performed, for example. Namely, the L-PCRF 610 of the base station side PCC 600 determines policy for local communication, and the L-OCS 620 determines a quota to be applied to the local communication, so as to give an instruction to the L-PCEF/TDF 220. The L-PCEF/TDF 220 executes the policy for local communication to count a data amount in the local communication. In the example of FIG. 3, the data amount is "B". The L-PCEF/TDF 220 transmits the counted data amount to the L-OCS 620.

The L-PCRF 610, the L-OCS 620, etc., for example, notify the counted data amount etc. in synchronization with the PCRF 410 and the OCS 420 of the core side PCC 400. The OCS 420 becomes able to calculate a data amount "A+B" of the two types of communication. This enables the execution of charging control for the UE 100 and the application of a new policy.

In the second configuration example, because the base station side PCC 600 is connected to the vicinity of the eNB 200, the PCC control can also be performed for local communication by edge computing.

Also, in comparison with the first configuration example, the second configuration example enables the reduction of transmission delay and network load. Further, after UE information related to the UE 100 is transferred from the core side PCC 400 to the base station side PCC 600, the second configuration example enables operation as a local PCC for the communication via core side. The details thereof will be described later.

Therefore, in the communication system 10 of the second configuration example, it is possible to efficiently perform policy control and charging control in the mobile-edge computing environment.

Additionally, the functional entity included in the base station side PCC 600 and the functional entity of the L-PCEF/TDF 220 etc. may be implemented in different apparatuses on the basis of each functional entity, similar to the functional entity included in the core side PCC 400 and the functional entity of the PCEF/TDF 320. Alternatively, all or a part of these functional entities may be implemented across a plurality of apparatuses, or all functions may be implemented in one apparatus. These apparatuses may be inside the eNB 200, inside the application server 500, or may be outside these apparatuses and connected to these apparatuses. Furthermore, these plurality of functional entities may be implemented as one functional entity, or some functional entities may be combined and implemented as one functional entity.

1.3 Third Configuration Example

Next, a third configuration example will be described. Before the description of the third configuration example, a description is given of an example of modeling to manage a data usage between the OCS and the PCEF.

FIGS. 4(A) through 4(D) represent examples of modeling a data usage when the OCS and the CEF have one-to-one relationship.

There is an upper limit value in the data usage of each user (or UE 100). The OCS 420 performs the dispensing (or reservation) of an available data amount so as not to exceed such an upper limit value. FIGS. 4(B) through 4(D) represent examples in which the upper limit value is set to be "3 GB (Gigabytes)" and the OCS 420 performs dispensing to the PCEF 320 on the basis of each "1 GB". The PCEF 320, after using the dispensed "1 GB", notifies the OCS to that effect.

FIGS. 5(A) through 5(F) represent examples of modeling a data usage in the case of a plurality of PCEF. The examples from FIGS. 5(A) through 5(F) represent each example of the PCEF 320 and the L-PCEF 220 provided as the plurality of PCEF.

In this case also, the OCS 420 dispenses an available data amount to each PCEF 220, 320 in such a manner that an available overall data usage does not exceed the upper limit value (for example "5 GB"). However, in each PCEF 220, 320, the data usage therein dynamically changes. Meanwhile, the PCEF 320 does not grasp the data usage of the L-PCEF 220, and also the L-PCEF 220 does not grasp the data usage of the PCEF 320. Therefore, the OCS 420, while synchronizing with two PCEF 220, 320 (or while checking the residual amount), dispenses half of each residual amount to the two PCEF 220, 320.

As depicted in FIGS. 5(A) to 5(F), in the case of the plurality of PCEF, interaction between the PCEF and the OCS increases in comparison with the case of one PCEF. The cause lies in that relationship between the OCS and the PCEF is 1-to-N (N is an integer of 2 or more, for example, and therefore interaction between the OCS and the PCEF increases in comparison with the case of one-to-one relationship between the OCS and the PCEF. The communication system 10 of the third configuration example is configured to suppress, for example, such an increase of interaction.

Figure 6:
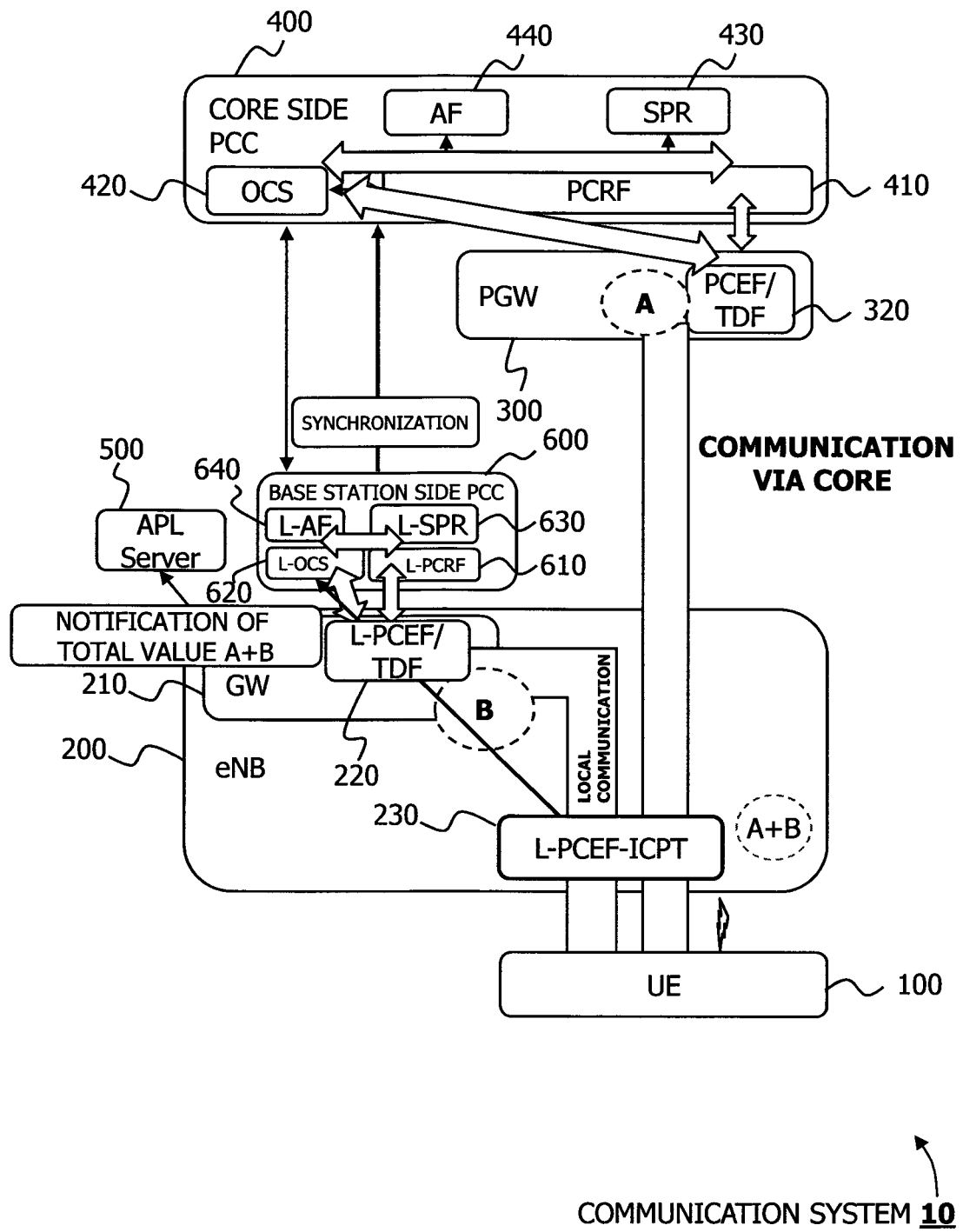
FIG. 6 is a diagram illustrating a configuration example of a communication system.

FIG. 6 represents the third configuration example of the communication system 10. The communication system 10 of the third configuration example further includes an L-PCEF-ICPT (L-PCEF-Intercept) (or monitor unit or monitor unit, which may hereafter be referred to as ICPT) 230.

The ICPT 230 monitors (or performs monitoring, which may hereinafter be referred to as "monitor") of the overall communication, for example. In the example of FIG. 6, the ICPT 230 monitors the two types of communication i.e. the local communication and the communication via core. Also, the ICPT 230 is provided, for example, at the intermediate point (which may hereafter be referred to as an "intercept point") of each communication path of the two types of communication i.e. the local communication and the communication via core at neither the end point of the local communication (for example, the GW 210) nor the end point of the communication via core (for example, the PGW 300). Then, the ICPT 230 notifies the base station side PCC 600 of the monitoring result with respect to the two types of communication i.e. the local communication and the communication via core. As an example of the monitoring result, there is a total value (or a total communication amount or a total usage, which may hereafter be referred to as "total value") of a data usage of the local communication and a data usage of the communication via core in regard to the UE 100, a data usage on the local communication side, or a combination thereof.

In this case, the ICPT 230 may notify the base station side PCC 600 of the counted total value when the total value exceeds the upper limit value of the data usage of the relevant user (or the UE 100). Then, the base station side PCC 600, on receiving the notification of the counted total value (or after checking that the total value exceeds the upper limit value) for example, notifies a synchronous signal (or a synchronous message) to the core side PCC 400. The core side PCC 400, by the reception of the synchronous signal, can grasp that the data usage of the overall communication of the relevant user exceeds the upper limit value. Based on such a notification, the core side PCC 400 can perform new policy control and charging control for the UE 100.

Alternatively, the ICPT 230 may count the total value of the overall communication to appropriately notify the base station side PCC 600 of the counted total value, for example. In this case, the base station side PCC 600 adds a plurality of times of total values in the received notification, and if the value thereof exceeds the upper limit value, transmits the synchronous signal to the core side PCC 400. If the notification is once, the base station side PCC 600 transmits the synchronous signal if the value thereof exceeds the upper limit value. The core side PCC 400, by the reception of the synchronous signal, can grasp that the data usage of the relevant user exceeds the upper limit value, so that can perform new policy control etc.

Alternatively, the ICPT 230 may, for example, count the total value of the overall communication to appropriately notify the base station side PCC 600 of the counted total value, if the total value of the overall communication exceeds the upper limit value.

Alternatively, for example, if the total value of the overall communication exceeds the upper limit value, the ICPT 230 may transmit the counted total value through the L-PCEF/TDF 220 or the base station side PCC 600 to the core side PCC 400.

In both cases, the ICPT 230 counts the total value of the data usage of the overall communication, and the notification timing of the counted value to the base station side PCC 400 may be at the time of exceeding the upper limit value, or at an appropriate time.

Further, in both cases, according to the third configuration example, the interaction between the core side PCC 400 and the base station side PCC 600 in regard to the data usage of the overall communication is performed only once. Accordingly, in the third configuration example, in comparison with a case when synchronous processing is performed for a plurality of times, the number of times of interaction concerned can be reduced without need of a plurality of times of synchronous processing. The details will be described later.

Also, in the third configuration example, similar to the second configuration example, the PCC control for local communication can be performed by the base station side PCC 600. Also, in the third configuration example, it is possible to reduce a transmission delay and also reduce a network load than in the second configuration example. Further, in the third configuration example, the ICPT 230 can calculate the data usage of the overall communication without calculation in the core side PCC 400. Further, in the third configuration example, by the ICPT 230, the PCC control for local communication can also be performed in the base station side PCC 600 without the involvement of the core side PCC 400. The details will also be described later.

Thus, the communication system 10 according to the third configuration example can perform efficient policy control and charging control in the mobile-edge computing environment.

Additionally, in the example of FIG. 6, the ICPT 230 may be disposed, for example, in the GW 210, or inside the P-PCEF/TDF 220, or further, may be inside the L-TDF 220 or inside the L-PCEF 220.

Also, the ICPT 230 may be, for example, one independent apparatus or may be a function provided in one communication apparatus. In this case, the communication apparatus concerned may be connected to the eNB 200, or the communication apparatus concerned may be included in the eNB 200. Alternatively, the communication apparatus may exactly be the eNB 200. The ICPT 230 may function, for example, similar to other functional entities, and the apparatus in which the function is executed may be the communication apparatus, the eNB 200, or the like.

Also, the ICPT 230 may be applicable to the first configuration example. The details will be described later.

The terminal 100 in the first embodiment corresponds to, for example, the UE 100. Also, the base station 200 in the first embodiment corresponds to, for example, the eNB 200. Further, the gateway apparatus 300 in the first embodiment corresponds to, for example, the PGW 300. Further, the communication apparatus 250 in the first embodiment corresponds to, for example, the eNB 200 or the ICPT 230. Further, the monitor unit 230 in the first embodiment corresponds to, for example, the ICPT 230. Further, the server apparatus 500 in the first embodiment corresponds to, for example, the application server 500. Further, the node apparatus 650 in the first embodiment corresponds to, for example, the core side PCC 400 or the base station side PCC 600.

1.4 Fourth Configuration Example

Figure 7:
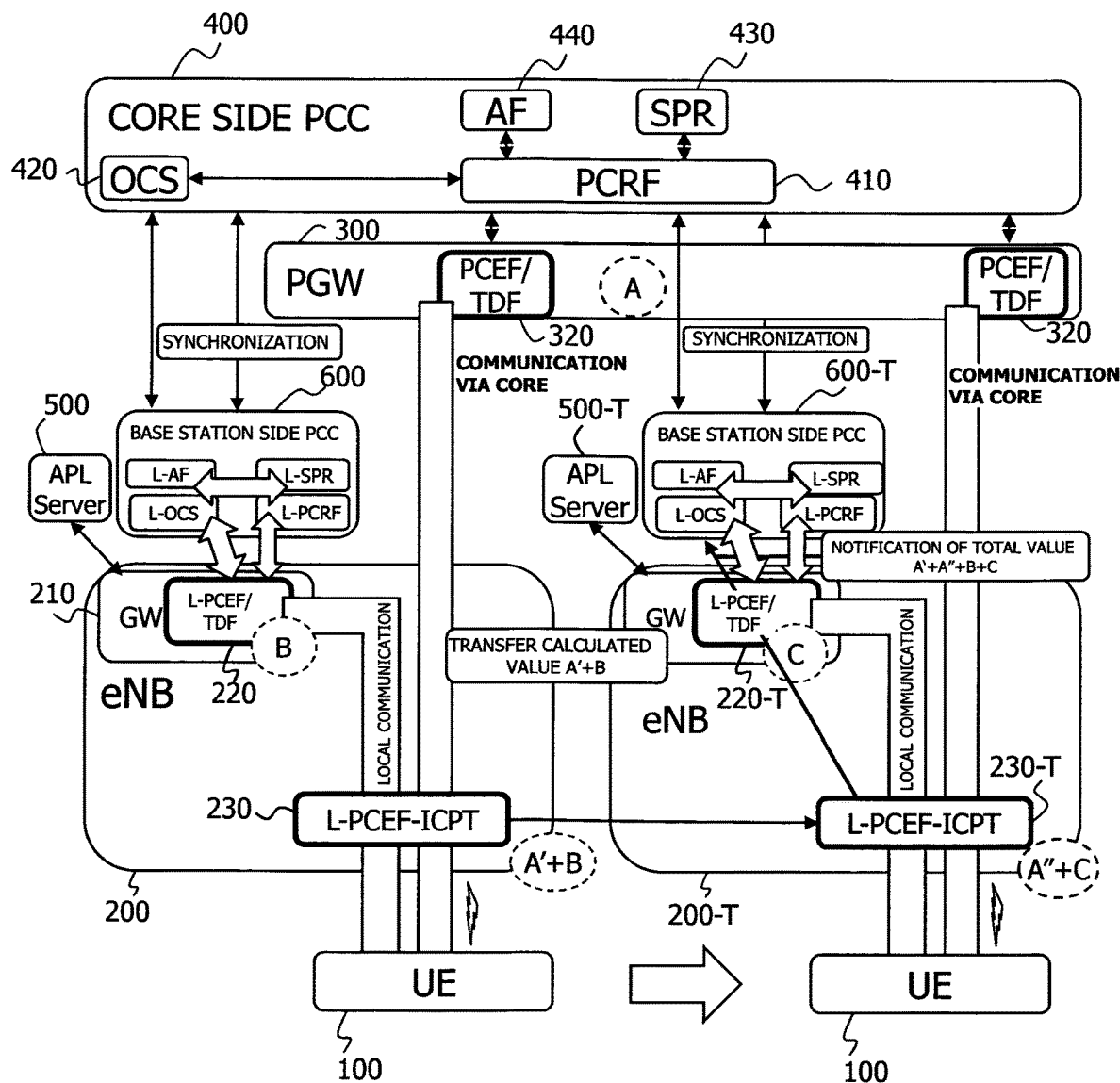
FIG. 7 is a diagram illustrating a configuration example of a communication system.

Next, a fourth configuration example will be described. The fourth configuration example is an example of a handover. FIG. 7 represents the fourth configuration example of the communication system 10.

In the fourth configuration example, a handover source ICPT 230 is configured to transfer the counted total value of the overall communication to a handover destination ICPT 230-T, when the UE 100 is handed over from a source eNB 200 of a handover source to a target eNB 200-T of a handover destination.

By the handover of the UE 100, the application server 500 to which the UE 100 is connected is switched over from the handover source to the application server 500-T of the handover destination. Therefore, the end point of the local communication changes before and after the handover. Therefore, if the handover destination ICPT 230-T transmits a total value (for example, "A"+C") counted by itself to the base station side PCC 600-T, the base station side PCC 600-T is unable to grasp a correct total value ("A+B+C"≠"A"+C") before and after the handover.

In the example of FIG. 7, the handover destination ICPT 230-T adds a total value ("A'+B") received from the handover source ICPT 230 to the total value ("A"+B") of the two types of communication counted by itself, so as to transmit a correct total value ("A'+A"+B+C"="A+B+C") to the base station side PCC 600-T.

In this case also, the ICPT 230-T may notify to the base station side PCC 600-T the total value when the total value exceeds the upper limit value, or may appropriately notify to the base station side PCC 600-T a value obtained by adding the total value, which is received from the handover source, to the total value counted by itself.

Accordingly, the communication system 10 of the fourth configuration example can perform PCC control using the total value in which each data amount before and after the handover is correctly reflected. Therefore, the communication system 10 of the fourth configuration example can perform efficient policy control and charging control in the mobile-edge computing environment.

2. Regarding Supplementary Descriptions of the First Configuration Example, the Second Configuration Example, and the Handover Next, supplementary descriptions will be given of the first configuration example, the second configuration example and the handover described above.

2.1 Supplementary Description of the First Configuration Example

Figure 8:
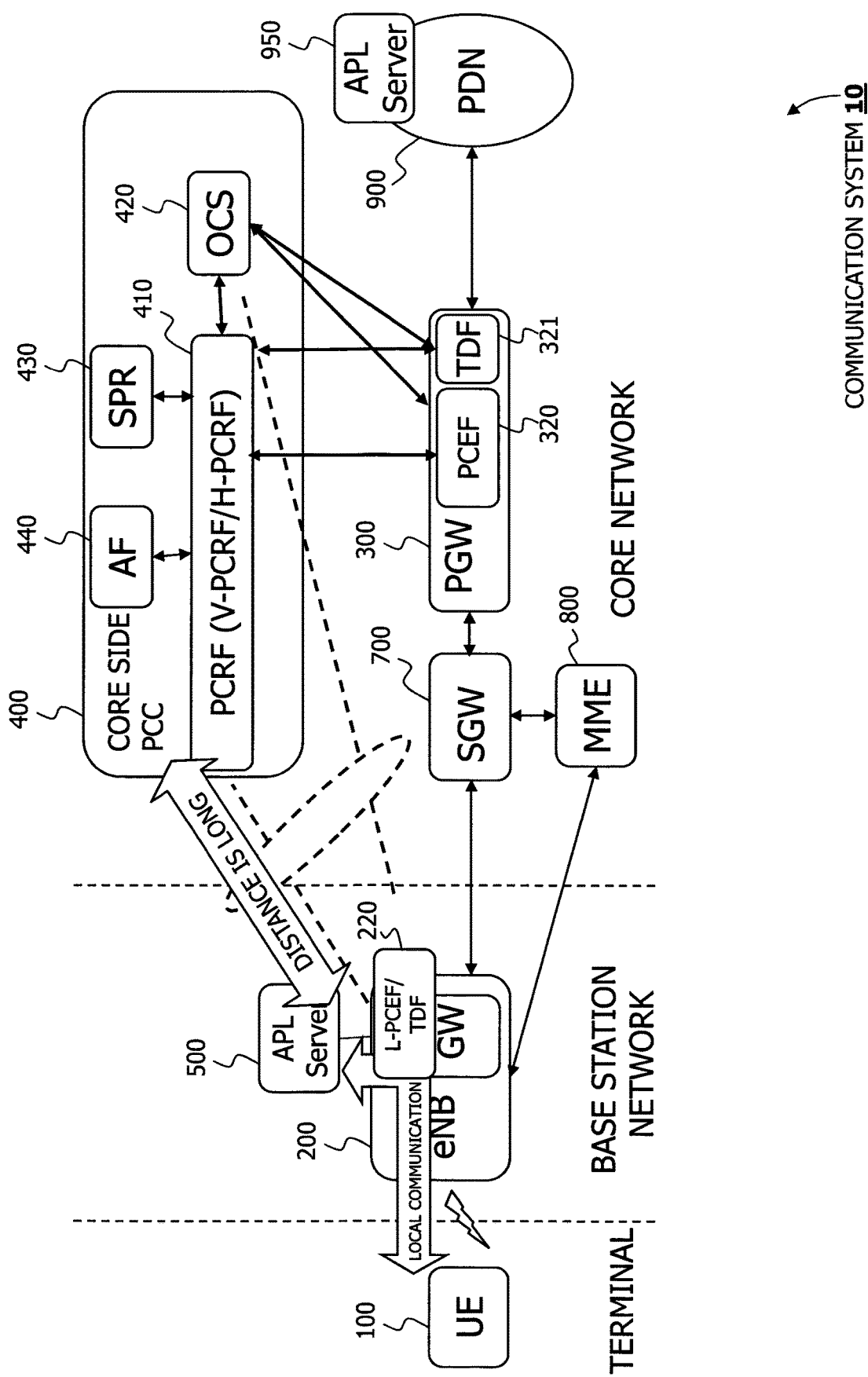
FIG. 8 is a diagram illustrating a configuration example of a communication system.

FIG. 8 represents the first configuration example of the communication system 10. The communication system 10 of the first configuration example can perform the PCC control for local communication by, for example, the L-PCEF/TDF 220.

However, in the first configuration example, the L-PCEF/TDF 220 is connected to the base station network, and a distance between the L-PCEF/TDF 220 and the core side PCC 400 is longer than the first threshold. Due to the length of this distance, there may be a case that a time consumed to perform message exchange related to the policy control and the charging control between the L-PCEF/TDF 220 and the core side PCC 400 and the L-PCEF/TDF 220 becomes a first time or longer. Due to the length of this distance, a transmission delay may occur. Also, the message exchange between the core side PCC 400 and the L-PCEF/TDF 220 may cause a communication load between the base station network and the core network.

As such, in the first configuration example, for example, (1) Transmission delay (Latency) and communication load may occur.

2.2 Supplementary Description of the Second Configuration Example

Figure 9:
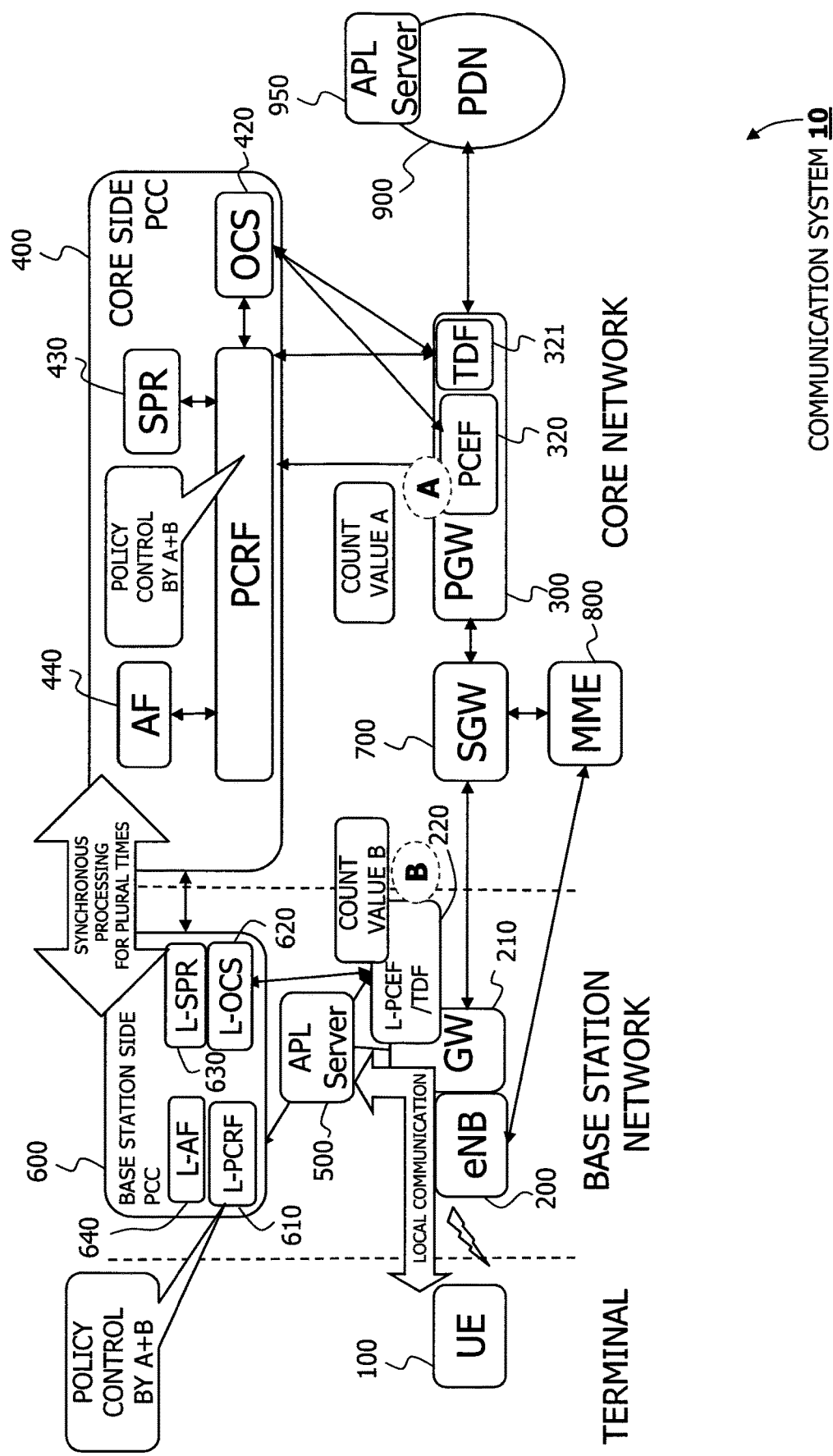
FIG. 9 is a diagram illustrating a configuration example of a communication system.

FIG. 9 represents the second configuration example of the communication system 10. In the second configuration example, for example, the base station side PCC 600 is connected to the vicinity of eNB 200, so that the PCC control for local communication can be controlled in the base station side PCC 600. Also, in the second configuration example, for example, the PCC control for local communication can be performed by the base station side PCC 600, so that the transmission delay between the core network and the base station network and the communication load can be reduced.

However, in the second configuration example, the data amount of local communication is counted in the L-PCEF/TDF 220, and the data amount of the communication via core is counted in the PCEF 320, so that the data amount of each communication is counted independently. In this case, for example, synchronous processing is performed for a plurality of times in the base station side PCC 600 and the core side PCC 400, so that the data amount of the local communication can be grasped in the core side PCC 400.

Further, in the second configuration example, for example, there may be a case of policy application in the core side PCC 400 using the total value of the two types of communication, i.e. the local communication and the communication via core, and therefore, there may be a case of collecting and adding each data amount (for example, "A" and "B") having been counted independently.

As such, in the second configuration example, for example, (2) A plurality of times of synchronous processing, and addition processing through the collection of independently counted data amounts may occur.

2.3 Supplementary Processing in Regard to Handover

Figure 10:
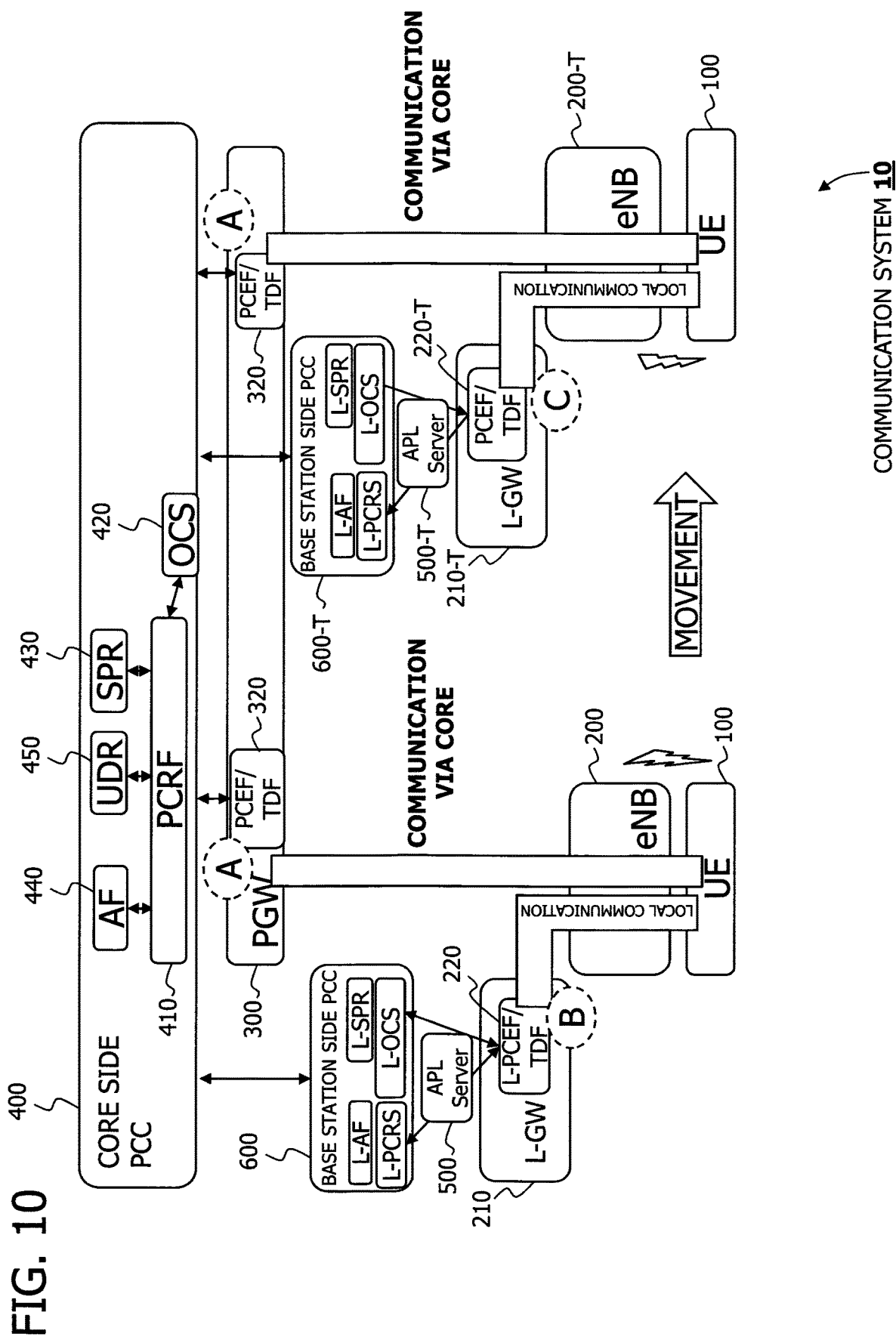
FIG. 10 is a diagram illustrating a configuration example of a communication system.

FIG. 10 is a diagram for describing supplementary processing in regard to handover. The communication system 10 of FIG. 10 is, for example, an example when the second configuration example is applied in the handover source and the handover destination.

As described above, by the handover, the end point of the local communication changes from the handover source GW 210 (or the application server 500) to the handover destination GW 210-T (or the application server 500-T).

In this case, for example, the handover source L-PCEF/TDF 220 counts the count value "B" of the local communication, and the handover destination L-PCEF/TDF 220-T counts the count value "C" of the local communication. It is not possible to grasp a correct total value ("A+B+C") in the core side PCC 400 if each data amount of the local communication before and after the handover is simply counted in the L-PCEF/TDF 220, 220-T. Therefore, in this case, there may be a case of being unable to accurately perform PCC control before and after the handover.

As such, as to the handover, for example, (3) A case of being unable to accurately perform PCC control before and after handover may occur.

3. Measures in the Third Configuration Example and the Fourth Configuration Example Next, descriptions will be given of how the above-mentioned (1) and (2) are coped with in the third configuration example, and how the above-mentioned (3) is coped with in the fourth configuration example, respectively.

3.1 Measures in the Third Configuration Example

Figure 11:
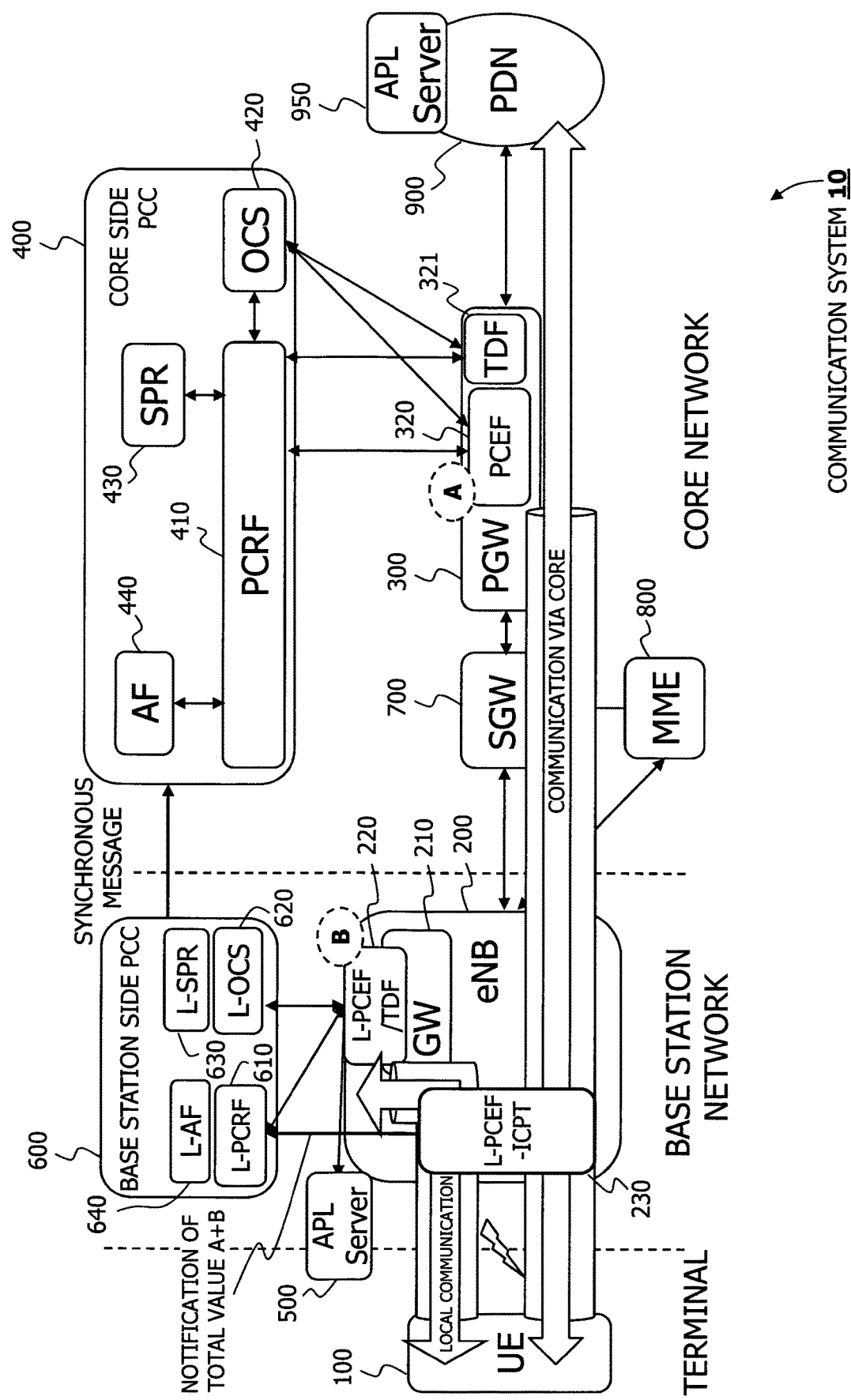
FIG. 11 is a diagram illustrating a configuration example of a communication system.

FIG. 11 represents the third configuration example of the communication system 10. In the communication system 10 of the third configuration example, the L-PCEF/TDF 220 and the base station side PCC 600 are connected to the base station network.

Now, a description will be given of measures in the third configuration example against the above-mentioned (1) transmission delay (Latency) and communication load.

Figure 12:
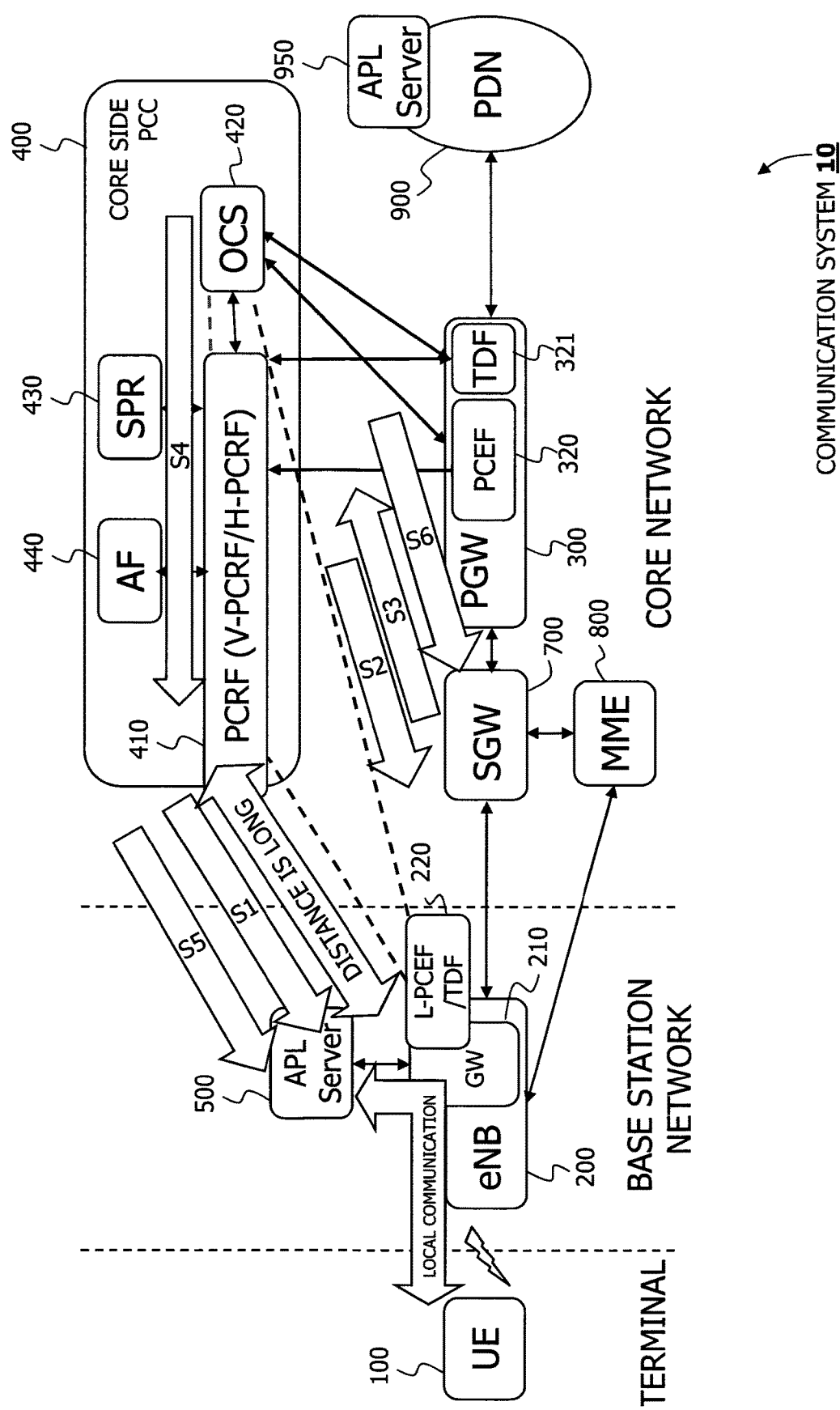
FIG. 12 is a diagram illustrating a configuration example of a communication system.

FIG. 12 is a diagram illustrating an example of PCC control in the communication system 10 of the first configuration example. For example, in regard to the local communication of the UE 100, consider a case of high speed communication up to the upper limit of 3 GB and low speed communication if the upper limit of 3 GB is exceeded.

First, the PCRF 410 determines to apply a high speed communication policy for the local communication of the UE 100, to instruct the L-PCEF/TDF 220 to apply the high speed communication policy (S1).

Next, the OCS 420, on receiving an instruction from the PCRF 410, instructs the L-PCEF/TDF 220 to apply a quota of the upper limit 3 of GB (S2).

Next, the L-PCEF/TDF 220 executes the high speed communication policy, counts the data amount of the local communication, and notifies the OCS 420 if the counted data amount exceeds the upper limit value (S3).

Next, the OCS 420, on receiving the notification, checks an available residual amount for the UE 100 to the upper limit 3 GB of the data amount for the local communication, and if the amount thereof becomes zero, notifies the PCRF 410 to that effect (S4).

Next, the PCRF 410 determines to apply a low speed communication policy for the local communication of the UE 100, to instruct the L-PCEF/TDF 220 to apply the low speed communication policy (S5).

Next, the OCS 420 instructs the L-PCEF/TDF 220 to apply a quota corresponding to the low speed communication policy (S6).

As such, in the core side PCC 400 and the L-PCEF/TDF 220 (or the core network and the base station network), a variety of instructions etc. are notified. For this reason, in the first configuration example, there are cases when a communication load occurs between the core network and the base station network. Also, as described above, because the distance between the core side PCC 400 and the L-PCEF/TDF 220 is longer than the first threshold, notification etc. may take a long time to reach the destination due to the length of the distance. For this reason, a transmission delay may occur in the first configuration example.

Figure 13:
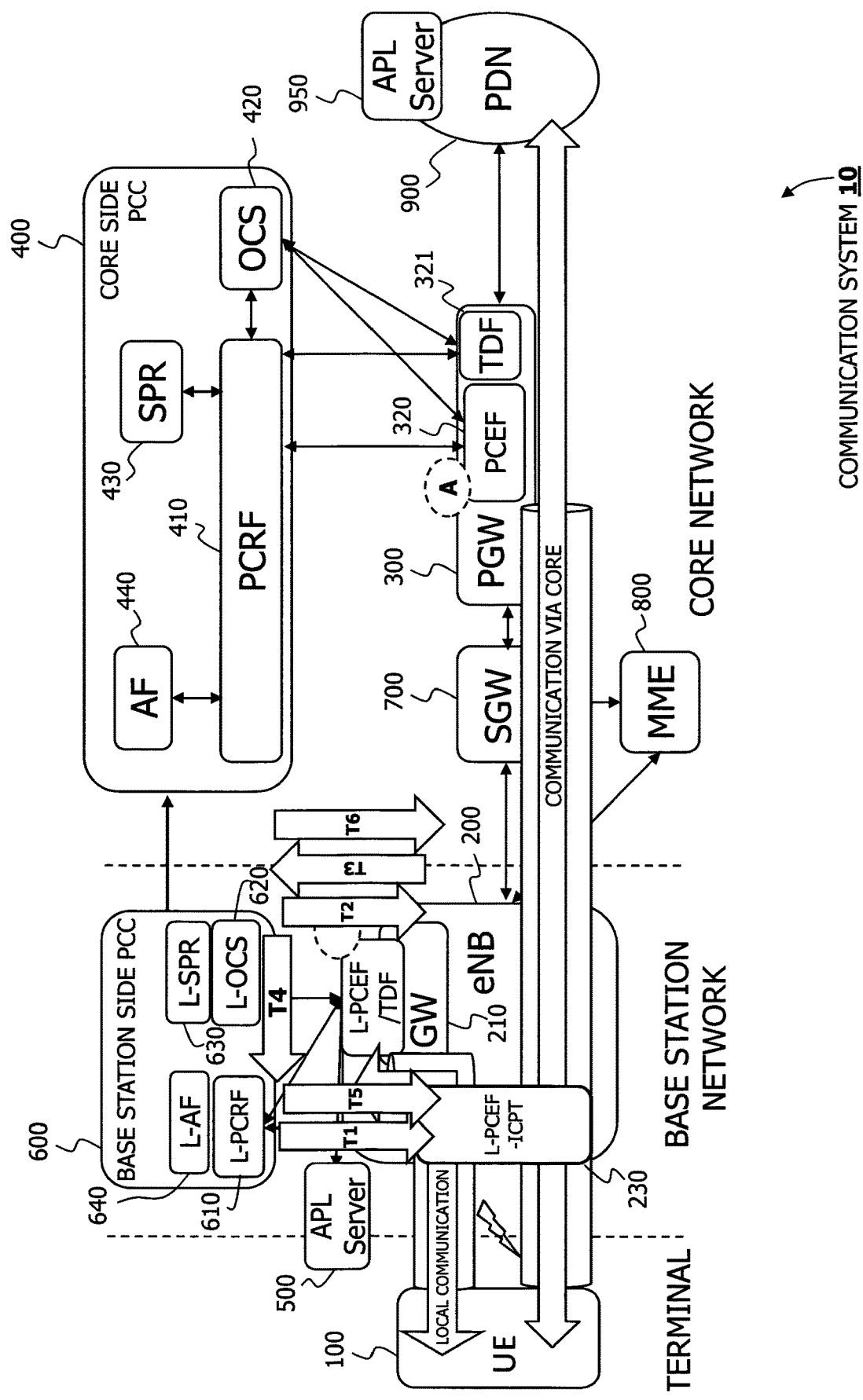
FIG. 13 is a diagram illustrating a configuration example of a communication system.

FIG. 13 is a diagram illustrating an example of PCC control in the communication system 10 of the third configuration example. The example depicted in FIG. 13 is, for example, also an example of PCC control for the local communication of the UE 100, in which high speed communication is applied up to the upper limit of 3 GB whereas low speed communication is applied when the upper limit of 3 GB is exceeded.

First, the L-PCRF 610 determines to apply a high speed communication policy for the local communication of the UE 100, to instruct the L-PCEF/TDF 220 to apply the high speed communication policy (T1).

Next, the L-OCS 620 instructs the L-PCEF/TDF 220 to apply a quota of the upper limit 3 GB (T2).

Next, the L-PCEF/TDF 220 executes the high speed communication policy, counts the data amount of the local communication, and notifies the L-OCS 620 if the counted data amount exceeds the upper limit value of 3 GB (T3).

Next, the L-OCS 620, on receiving the above notification, checks an available residual amount up to the upper limit 3 GB for local communication in the UE 100, and if the amount becomes zero, notifies the L-PCRF 610 to that effect (T4).

Next, the L-PCRF 610 determines to apply a low speed communication policy for the local communication of the UE 100, to instruct the L-PCEF/TDF 220 to apply the low speed communication policy (T5).

Next, the L-OCS 620 instructs the L-PCEF/TDF 220 to apply a quota corresponding to the low speed communication policy (S6).

As such, the communication system 10 of the third configuration example performs the PCC control for local communication inside the base station network, so that notification through the core network is eliminated, and therefore, the above-mentioned (1) transmission delay and communication load can be reduced.

Additionally, in FIG. 13, the communication system 10 excluding the ICPT 230 becomes the communication system 10 of the second configuration example. In such a communication system 10 of the second configuration example, the PCC control similar to FIG. 13 is possible, and therefore, also in the communication system 10 of the second configuration example, it is possible to reduce the above-mentioned (1) transmission delay and communication load.

Next, a description will be given of measures in the third configuration example against the above-mentioned (2) a plurality of times of synchronous processing and addition processing.

Figure 14:
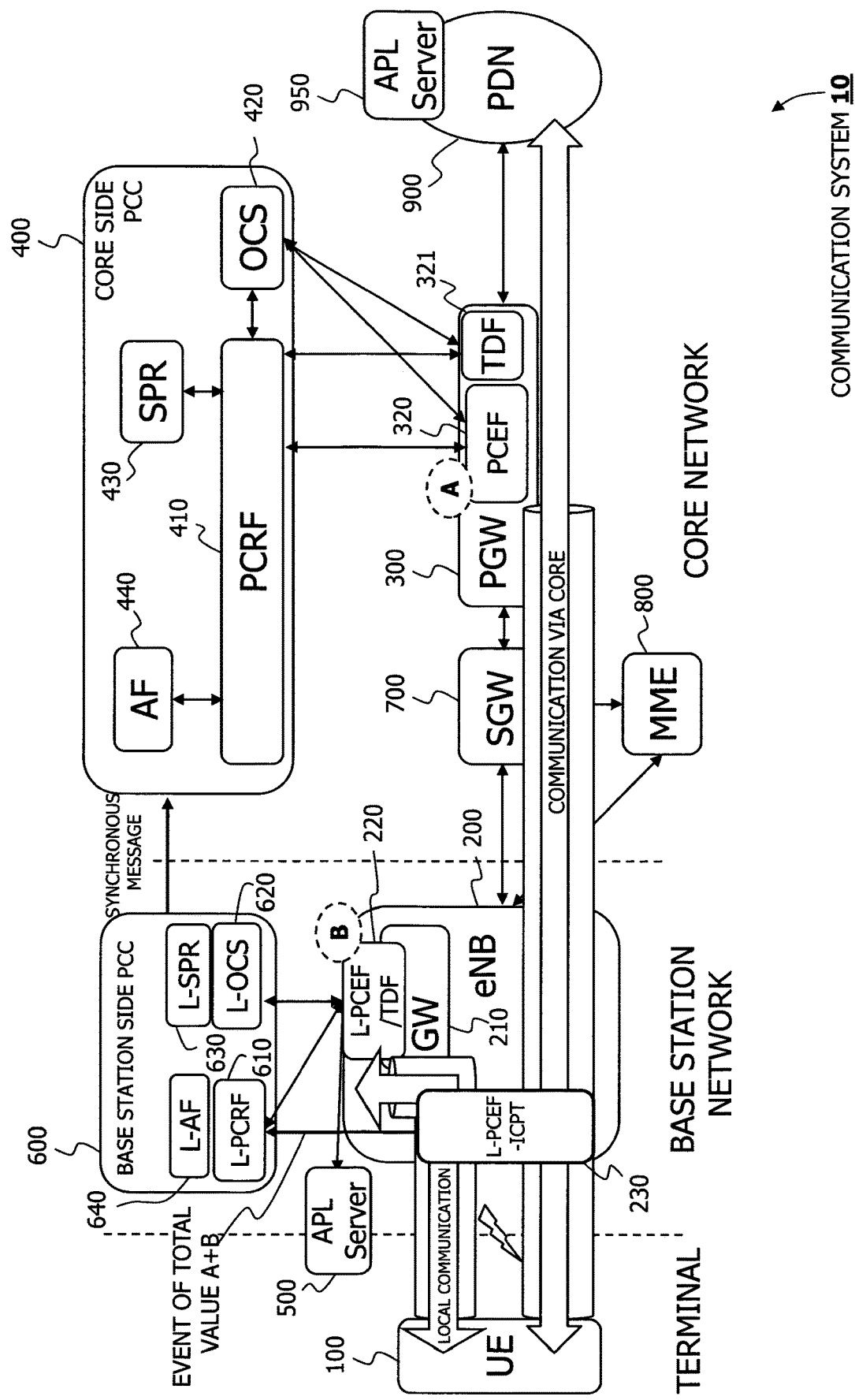
FIG. 14 is a diagram illustrating a configuration example of a communication system.

FIG. 14 is a diagram illustrating an example of synchronous message transmission in the communication system 10 of the third configuration example. In the communication system 10 of the third configuration example, there is provided an ICPT 230 capable of monitoring the communication of both the local communication and the communication via core.

For example, the ICPT 230 counts the respective data amount of the local communication and the communication via core, and also counts the total value thereof, and if the total value exceeds the upper limit value, notifies the base station side PCC 600 of the total value (or a total value event). The base station side PCC 600, on receiving the total value event, notifies a synchronous message to the core side PCC 400. The core side PCC 400, on receiving the notification, can grasp that the data usage of the overall communication in the UE 100 exceeds the upper limit.

As such, in the communication system 10 of the third configuration example, because of the ICPT 230, data amount counting having been executed at each end point of the local communication and the communication via core is no more executed, and therefore, the overall communication can be monitored on the base station network side. Accordingly, in the third configuration example, the collection of count values counted at each end point and addition processing in the core side PCC 400 etc. are no more executed.

Further, between the base station side PCC 600 and the core side PCC 400, the notification of the data usage of the overall communication can be performed by a one-time synchronous message, and therefore, there becomes no need to perform a plurality of times of synchronous processing (for example, FIG. 9) for the data amount of local communication. Accordingly, in the third configuration example, it is possible to suppress the occurrence of a plurality of times of synchronous processing in the base station network and the core network.

From the above, by the second and third configuration examples, for example, the above-mentioned (1) can be reduced, and by the third configuration example, the above-mentioned (2) can be suppressed.

3.2 Measures in the Fourth Configuration Example

Figure 15:
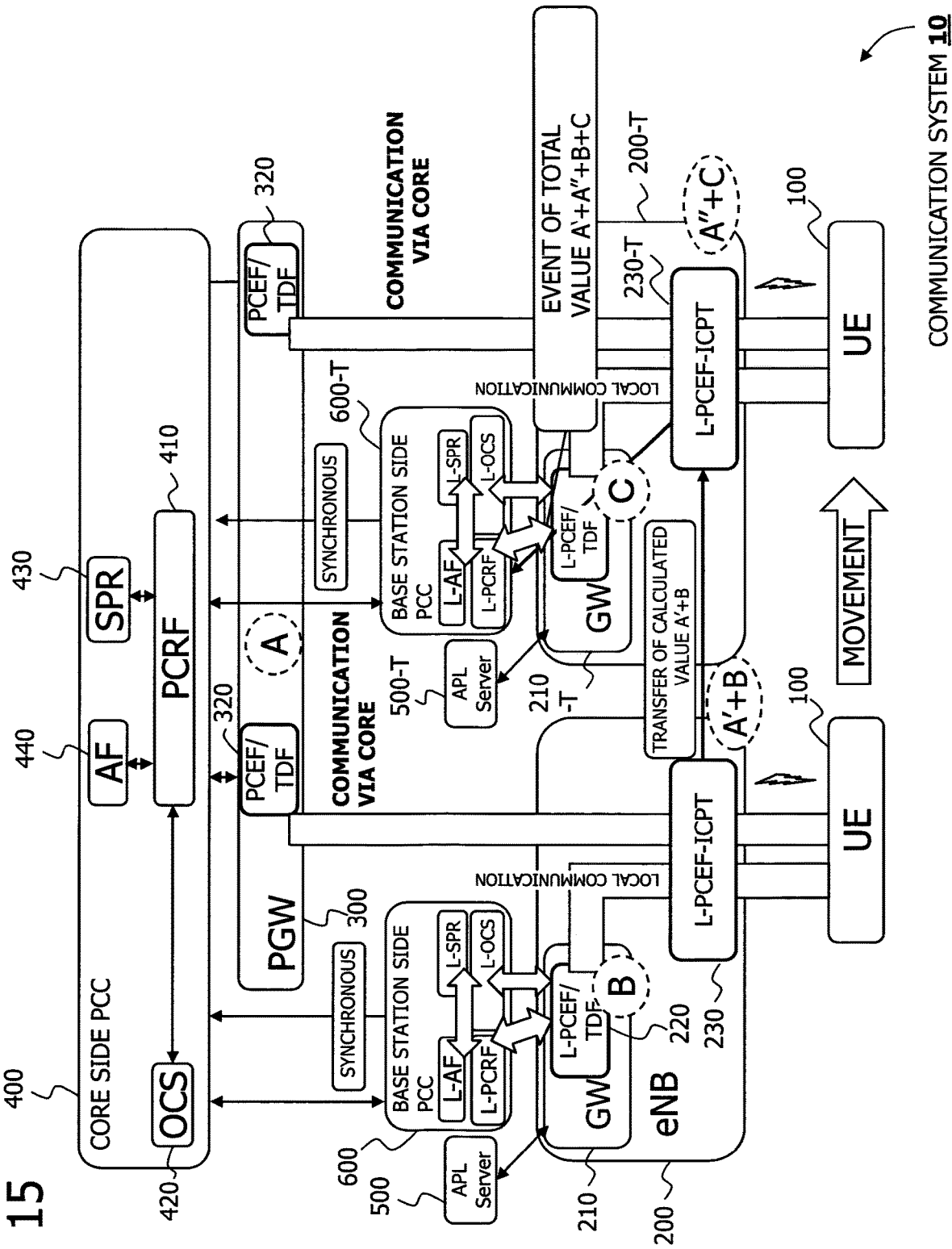
FIG. 15 is a diagram illustrating a configuration example of a communication system.

FIG. 15 represents the fourth configuration example of the communication system 10. The handover source ICPT 230 can, for example, transfer the data amount "B" of the local communication to the handover destination ICPT 230-T. However, in this case, as for the communication via core, the handover destination ICPT 230 counts from the middle of the communication, and therefore, it is not possible to correctly reflect the accurate data amount "A" of the communication via core before and after the handover.

In the fourth configuration example, the handover source ICPT 230 transfers a data amount count value "A'+B" to the handover destination ICPT 230-T, so that the ICPT 230-T adds the received count value "A'+B" to "A"+C" counted by itself. The added value comes to "A'+A"+B+C"="A+B+C", which is a correct total value. When the total value exceeds the upper limit value, the ICPT 230-T transmits the counted total value to the base station side PCC 600-T. The base station side PCC 600-T transmits a synchronous message to the core side PCC 400. Based on the synchronous message, the core side PCC 400 can apply a new policy to the UE 100 after the handover, and accordingly, can perform accurate PCC control.

In this case, it is also possible for the handover source ICPT 230 to transmit the counted total value ("A'+B") through the base station side PCC 600 to the core side PCC 400. However, this causes an increase of interaction between the base station side PCC 600 of the handover source and the core side PCC 400. In the fourth configuration example, there is no interaction of the count value between the base station side PCC 600 of the handover source and the core side PCC 400, so that load reduction in the core network and the base station network can also be achieved.

4. Details of the Third Configuration Example and the Fourth Configuration Example Next, the details of the third configuration example and the fourth configuration example will be described. However, as to the fourth configuration example, the description has been given in <3.2 Measures in the fourth configuration example> using FIG. 15. Here, the details of the third configuration example will be described.

4.1 Details of the Third Configuration Example

Figure 16:
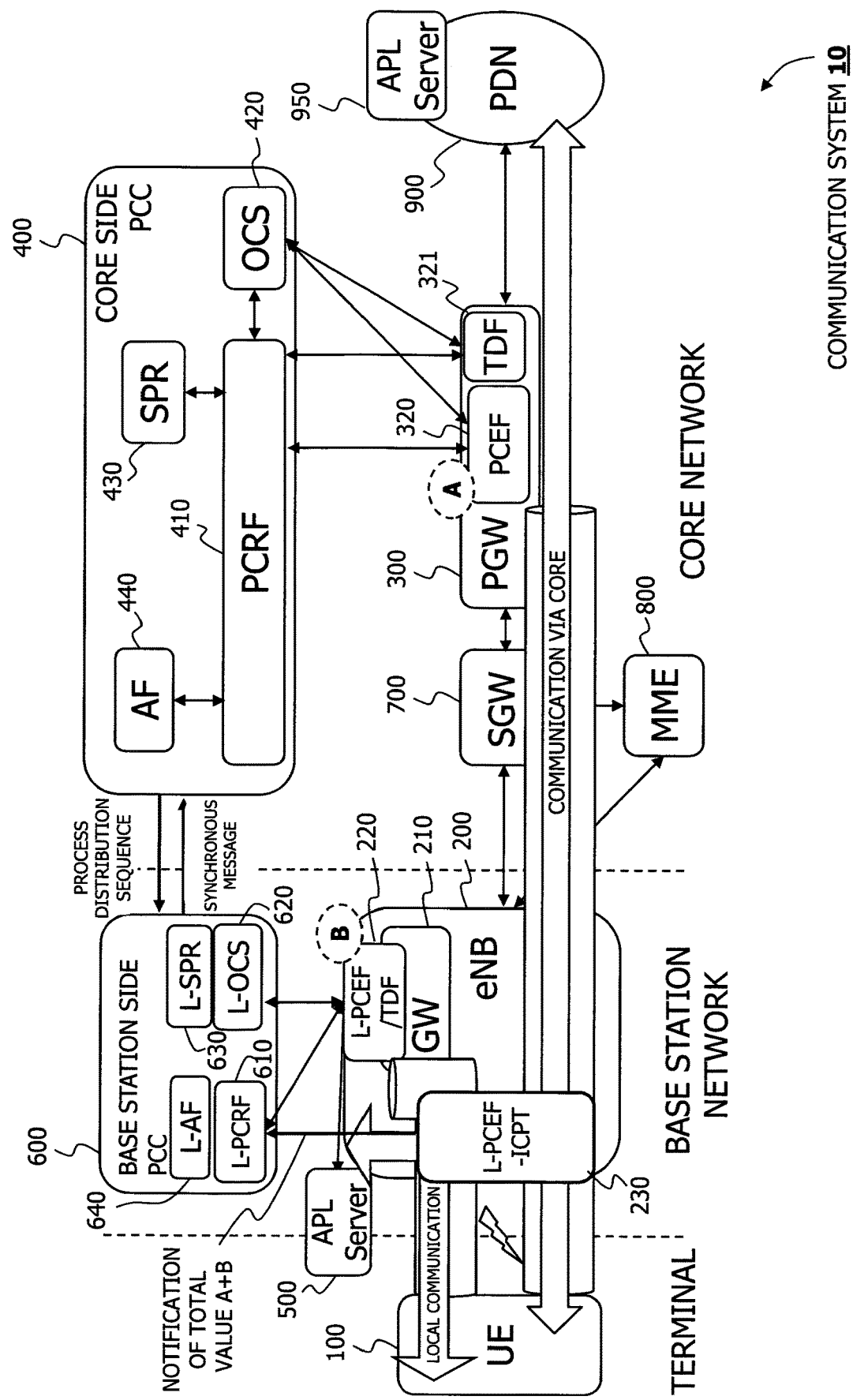
FIG. 16 is a diagram illustrating a configuration example of a communication system.

FIG. 16 represents the third configuration example of the communication system 10. Though the third configuration example of the communication system 10 has been described in FIG. 11 etc., in FIG. 16, an example in which a process distribution sequence is transmitted is included further. The description of the process distribution sequence etc. will be given in the operation example described later.

The third configuration example of the communication system 10 depicted in FIG. 16 further includes an SGW 700, an MME 800, a PDN 900 and an application server 950.

The SGW 700 is, for example, a gateway or a node to connect LTE user data to 2G and 3G, and includes a legal intercept function. The MME 800 is, for example, a communication control apparatus performing communication control of the UE 100 in the core network, and performs handover control, a paging function, an authentication management function, or the like, for the UE 100. The PDN 900 is, for example, an external network such as the Internet. The application server 950 provides the UE 100 with a variety of services such as Web browsing service, video distribution service, etc., for example.

Figure 17:
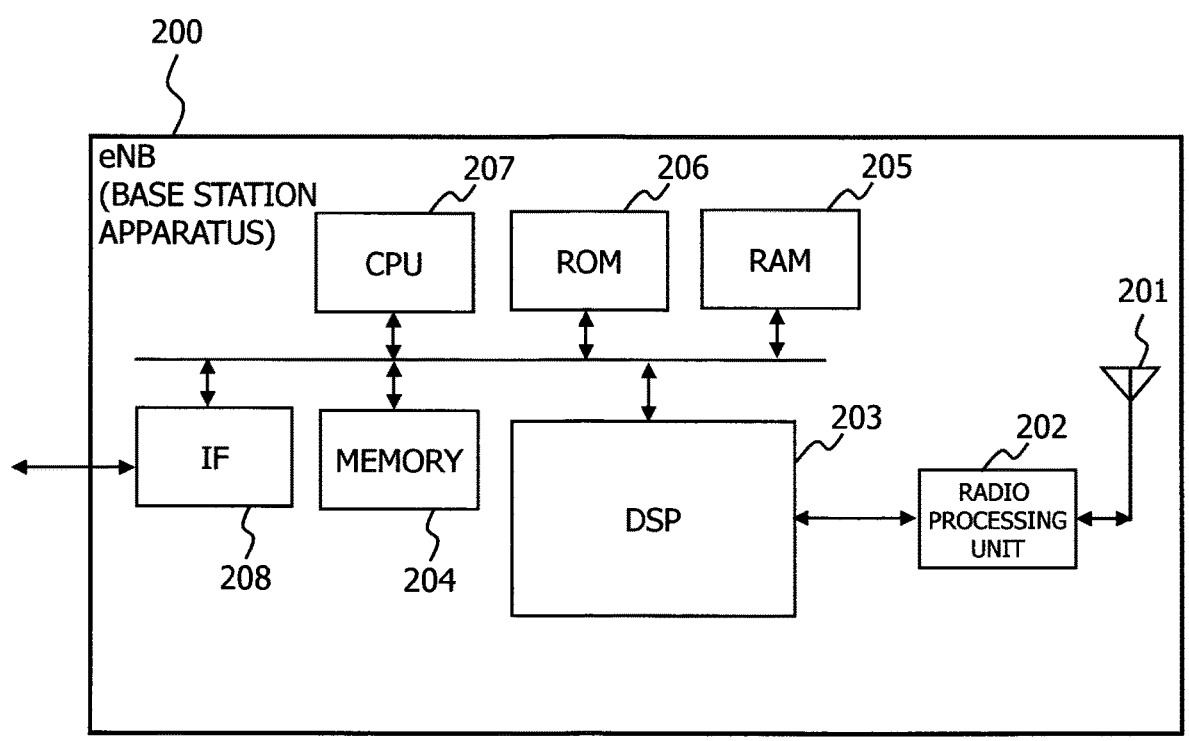
FIG. 17 is a diagram illustrating an eNB configuration example.

FIG. 17 represents a hardware configuration example of the eNB 200. The eNB 200 includes an antenna 201, a radio processing unit 202, a DSP (Digital Signal Processor) 203, a memory 204, a RAM (Random Access Memory) 205, a ROM (Read Only Memory) 206, a CPU (Central Processing Unit) 207 and an IF (Interface) 208.

The antenna 201 exchanges radio signals with the UE 100. The radio processing unit 202, for example, converts a radio signal received in the antenna 201 into a baseband signal to output to the DSP 203, and converts a baseband signal output from the DSP 203 into a radio signal to output to the antenna 201. The DSP 203, for example, performs error correction decoding processing (which may hereafter be referred to as decoding processing) etc. on the baseband signal output from the radio processing unit 202, so as to extract data etc. and output the extracted data to the memory 204 and the IF 208. Further, the DSP 203, for example, receives data etc. output from the memory 204 and the IF 208, to perform error correction coding processing (which may hereafter be referred to as coding processing) etc. on the received data to convert into a baseband signal to output to the radio processing unit 202.

The CPU 207 reads out a program stored in the ROM 206 to load into the RAM 205 and execute the loaded program, to thereby execute the functions of the GW 210, the L-PCEF/TDF 220 and the ICPT 230. Accordingly, the CPU 207 corresponds to, for example, the GW 210, the L-PCEF/TDF 220 and the ICPT 230.

The IF 208, for example, converts data etc. received from the DSP 203 into packet data having a format transmittable to the application server 500 and the SGW 700, so as to transmit. Also, the IF 208 extracts data etc. from packet data received from the application server 500 and the SGW 700, to output to the DSP 203 and the memory 204.

Figure 18:
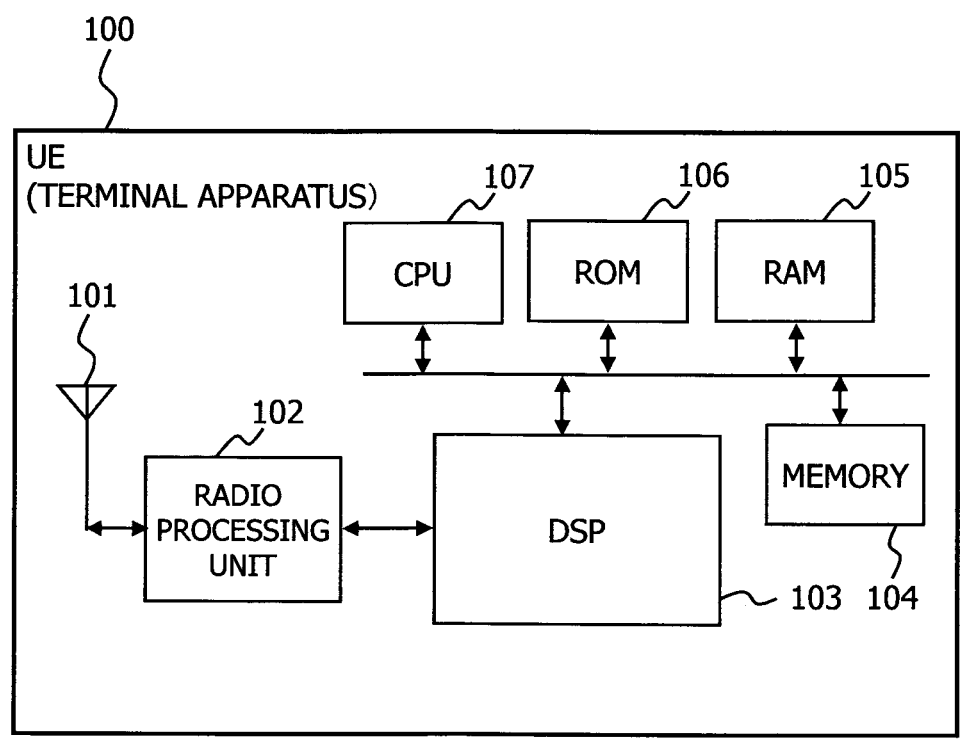
FIG. 18 is a diagram illustrating a UE configuration example.

FIG. 18 represents a hardware configuration example of the UE 100. The UE 100 includes an antenna 101, a radio processing unit 102, a DSP 103, a memory 104, a RAM 105, a ROM 106 and a CPU 107.

The antenna 101 exchanges radio signals with the UE 100. The radio processing unit 102, for example, converts a radio signal from the antenna 101 into a baseband signal to output to the DSP 103, and also converts a baseband signal output from the DSP 103 into a radio signal to output to the antenna 101. The DSP 103, for example, performs decoding processing etc. on the baseband signal from the radio processing unit 102 to extract data etc., so as to output the extracted data to the memory 104 and the CPU 107. Further, the DSP 103, for example, receives data etc. output from the memory 104 and the CPU 107, to perform coding processing etc. on the received data to convert into a baseband signal to output to the radio processing unit 102.

The CPU 107 reads out a program stored in the ROM 106 to load into the RAM 105 and execute the loaded program, so that can execute a variety of functions in the UE 100.

Figure 19:
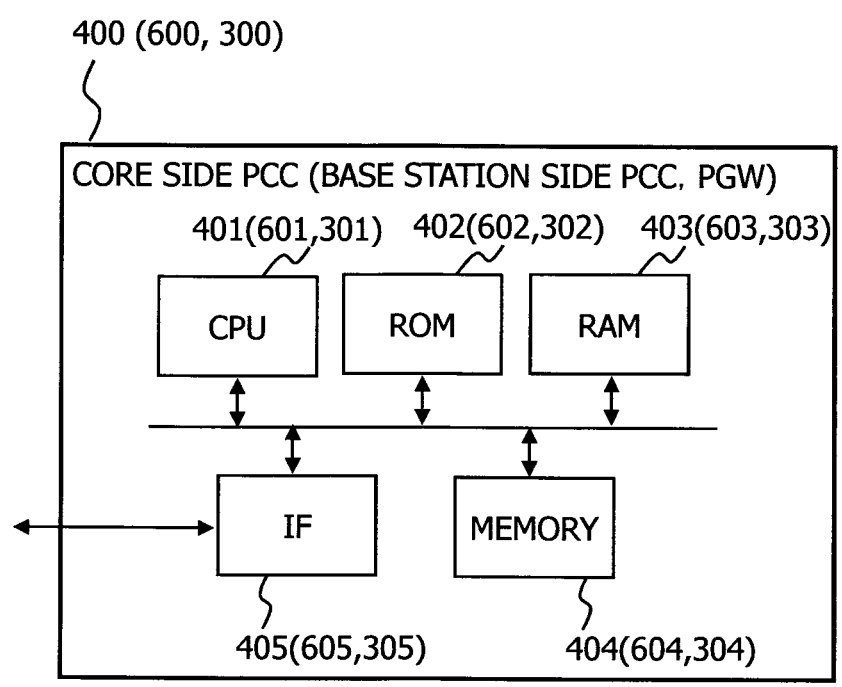
FIG. 19 is a diagram illustrating a configuration example of a core side PCC, a base station side PCC or a PGW.

FIG. 19 represents a hardware configuration example of the core side PCC 400. The core side PCC 400 includes a CPU 401, a ROM 402, a RAM 403 a memory 404 and an IF 405.

The CPU 401 loads a program stored in the ROM 402 and executes the loaded program to thereby execute the functions of the PCRF 410, the OCS 420, the SPR 430 and the AF 440. Accordingly, the CPU 401 corresponds to, for example, the PCRF 410, the OCS 420, the SPR 430 and the AF 440.

The memory 404 stores data and information related to PCC by the control of the CPU 401, for example. The IF 405 exchanges an instruction, a message, etc. related to PCC between with the PGW 300 and the base station side PCC 600, for example. In this case, the IF 405 may exchange the instruction etc. using a Diameter protocol, for example. The Diameter protocol is a communication protocol specified in "RFC (Request For Comment) 4006" or the like.

Further, FIG. 19 represents a hardware configuration example of the base station side PCC 600. The base station side PCC 600 includes a CPU 601, a ROM 602, a RAM 603, a memory 604 and an IF 605.

The CPU 601 reads out a program stored in the ROM 602 to load into the RAM 603 and execute the loaded program, to thereby execute each functional entity of the L-PCEF 610, the L-OCS 620, the L-SPR 630 and the L-AF 640. Accordingly, the CPU 601 corresponds to, for example, the L-PCEF 610, the L-OCS 620, the L-SPR 630 and the L-AF 640.

The memory 604 stores data and information related to PCC for local communication by the control of the CPU 601, for example. The IF 605 exchanges an instruction, a message, etc. related to PCC between with the eNB 200 and the core side PCC 400, for example. The IF 605 may also exchange the instruction etc. using the Diameter protocol, for example.

Further, FIG. 19 also represents a configuration example of the PGW 300. The PGW 300 includes a CPU 301, a ROM 302, a RAM 303, a memory 304 and an IF 305.

The CPU 301 reads out a program stored in the ROM 302 to load into the RAM 303 and execute the loaded program, to thereby execute each functional entity of the PCEF 320 and the TDF 321, for example. Accordingly, the CPU 301 corresponds to, for example, the PCEF 320 and the TDF 321.

Incidentally, the above-mentioned CPU 107, 207, 307, 401 and 601 may be other controllers or control units including an MPU (Micro-Processing Unit), a DSP, an FPGA (Field Programmable Gate Array) and the like.

Figure 20:
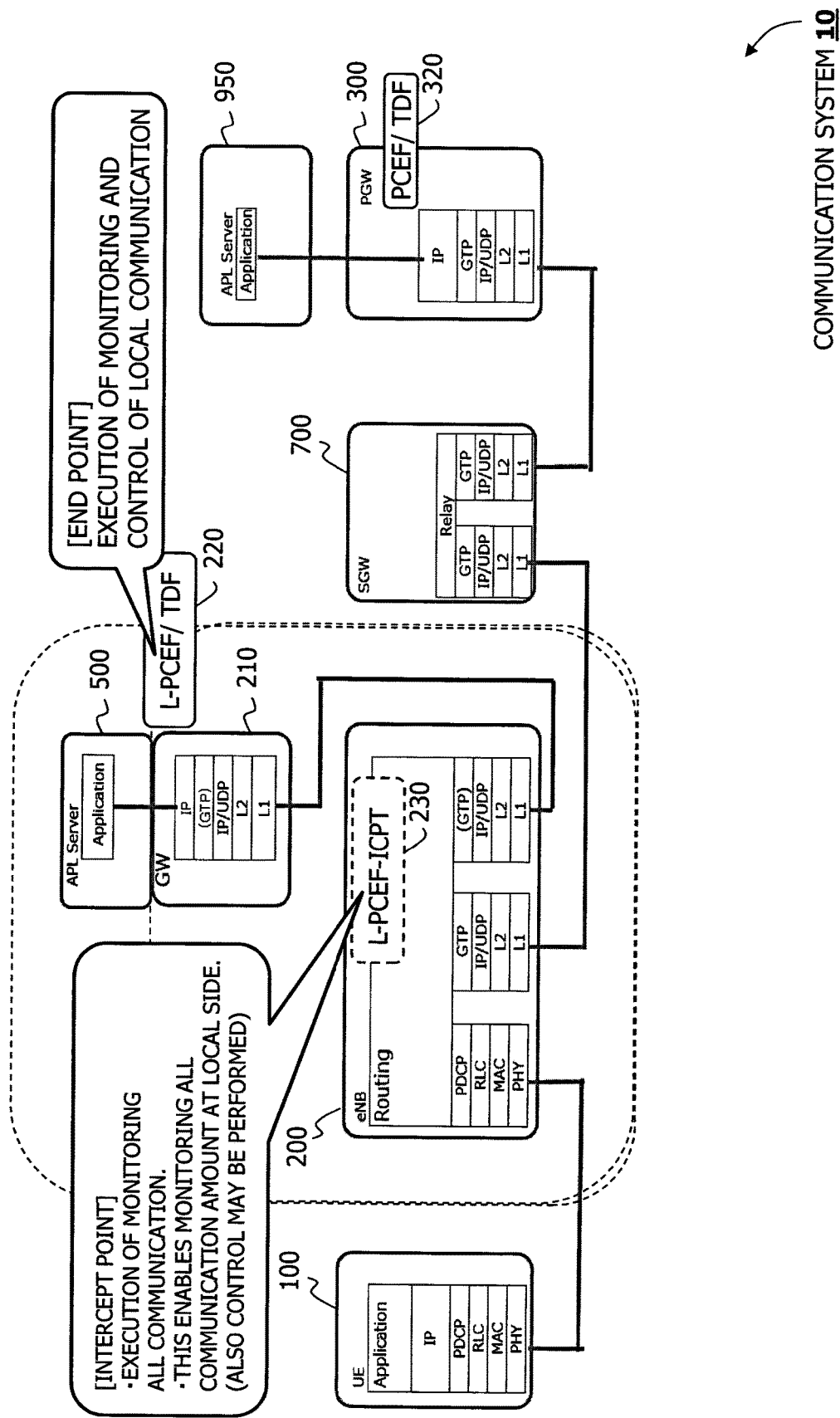
FIG. 20 is a diagram illustrating an example of a protocol stack in a communication system.

FIG. 20 represents an example of a protocol stack of a user plane (or user data) in the communication system 10.

The ICPT 230 can monitor the overall communication at the intercept point. The intercept point is located in the middle between the GW 210 and the UE 100 in the local communication, and in the middle (or an intermediate point) between the PGW 300 and the UE 100 in the communication via core. By monitoring data at such an intercept point by the ICPT 230, it is possible to monitor both of the local communication and the communication via core.

For example, the ICPT 230 monitors each IP (Internet Protocol) packet. The ICPT 230 counts, for example, the number of packets of each IP packet of which transmission source or transmission destination is the application server 500 (or the GW 210) and the number of packets of each IP packet of which transmission source or transmission destination is the PSW 300, so that can count the total value of the data usage of the two types of communication.

As depicted in the example of FIG. 20, the GW 210 is, for example, a bearer end point. By the provision of the L-PCEF/TDF 220 (or the disposition of the L-PCEF/TDF 220 on the flow path of the local communication), the GW 210 can perform monitoring, PCC control, etc. for the local communication.

Additionally, the ICPT 230 may perform PCC control for local communication performed in the L-PCEF/TDF 220, other than monitoring a data amount. In this case, the ICPT 230 and the L-PCEF/TDF 220 may configure one functional entity. For example, the ICPT 230 may perform PCC control by receiving an instruction of the base station side PCC 600, and the L-PCEF/TDF 220 may monitor a data amount of the overall communication.

Further, for example, the PCEF/TDF 320 can monitor a data amount of the communication via core at the end point of an EPS bearer, and can perform PCC control for the communication via core by receiving an instruction from the core side PCC 400.

Operation Examples

Next, operation examples of the third configuration example and the fourth configuration example of the communication system 10 will be described.

5. Operation Example in the Third Configuration Example

The operation example of the third configuration example of the communication system 10 will be described. The operation example of the third configuration example will be described in the following order.
<5.1 PCC distributed processing>
<5.2 Bearer establishment operation>
<5.2.1 Example of default bearer establishment operation >
<5.2.2 Example of dedicated bearer establishment operation>
<5.3 Example of PCC control>
<5.3.1 Example of PCC control on the local communication side>
<5.3.2 Example of distributed PCC control>
<5.3.3 Example of centralized PCC control>
<5.3.4 Other PCC processing examples>

5.1 PCC Distributed Processing

Figure 21:
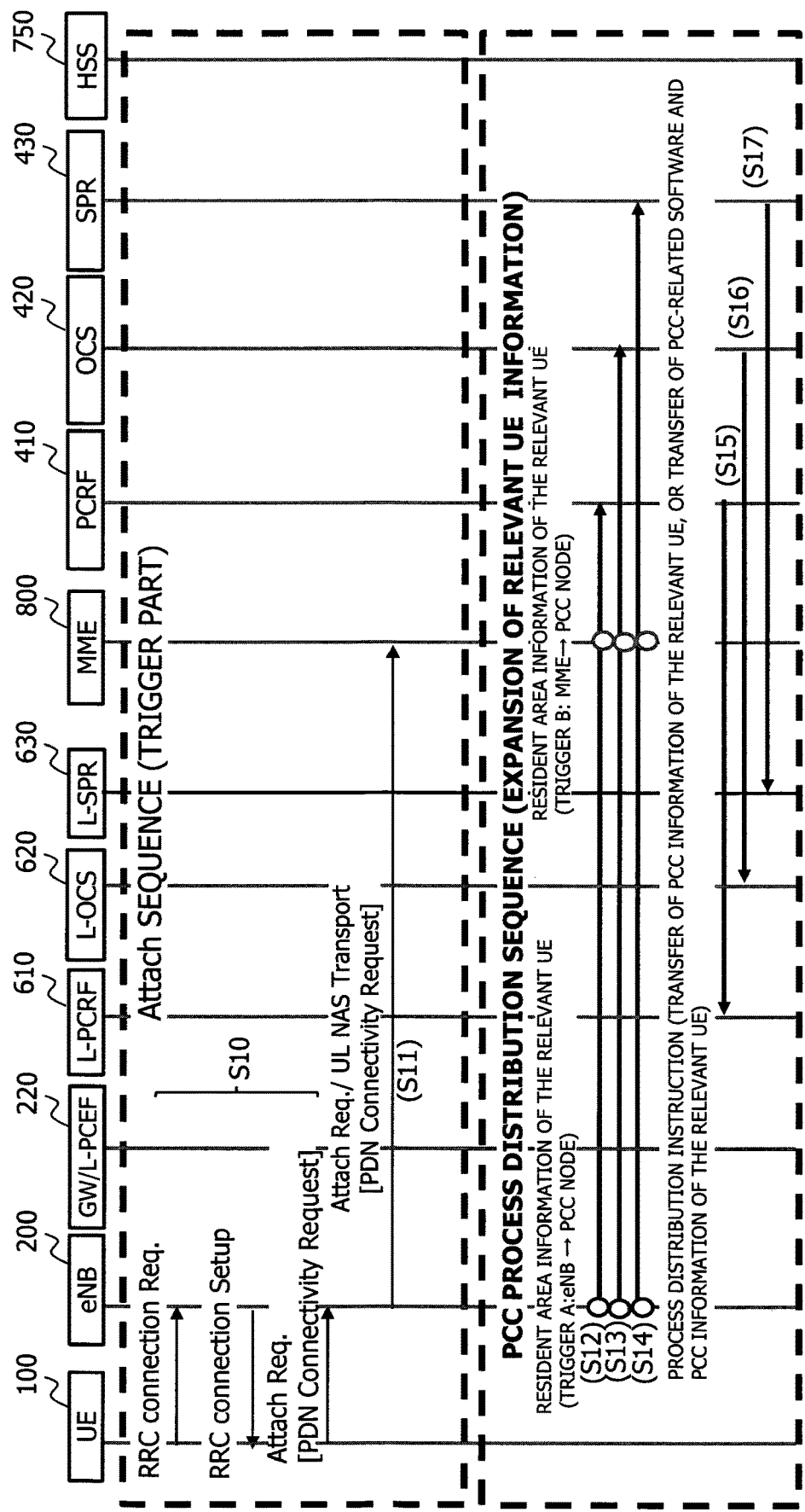
FIG. 21 is a diagram illustrating a sequence example representing an operation example of PCC distribution processing.

FIG. 21 is a sequence diagram illustrating an operation example of PCC distributed processing. By the PCC distributed processing, for example, the distribution of PCC processing is instructed from the core side PCC 400 to the base station side PCC 600, and the PCC information of the relevant UE 100 is transferred (or expanded), so that PCC control can be performed in the base station side PCC 600.

The PCC distributed processing depicted in FIG. 21 includes, as a whole, an initial registration (or registration, or Attach) sequence (S10-S11) and a PCC processing sequence (S12-S17).

The UE 100 exchanges with the eNB 200 a series of messages related to connection to a network (S10).

The eNB 200, on receiving an "Attach Request" from the UE 100, transmits to the MME 800 an initial registration request (for example, Attach Request/UL NAS Transport) of the UE 100 (S11). Here, "Attach Request" and "Attach Request/UL NAS Transport" may, for example, be an initial registration request (or an initial registration request signal), a registration request (or a registration request signal) or a connection request (or a connection request signal), and may be any requests or signals as long as providing such functions. In the following, "Attach Request" etc. may be referred to as initial registration request, for example.

The eNB 200, when transmitting the initial registration request for the UE 100 to the MME 800, transmits the resident area information of the relevant UE 100 to the PCRF 410, the OCS 420 and the SPR 430 (S12-S14). In this case, the eNB 200, triggered by the initial registration request transmitted to the MME 800, transmits the resident area information.

Alternatively, the MME 800, on receiving the initial registration request from the eNB 200 (S11), may transmit the resident area information of the relevant UE 100 to the PCRF 410, the PCS 420 and the SPR 430 (S12-S14). In this case, triggered by the initial registration request received from the eNB 200, the MME 800 transmits the resident area information.

The PCRF 410, the OCS 420 and the SPR 430 which have received the resident area information respectively transmit process distribution instructions to the L-PCRF 610, the L-OCS 620 and the L-SPR 630 (S15-S17).

For example, based on the resident area information of the UE 100, the PCRF 410, the OCS 420 or the SPR 430 may discriminate whether or not identification information included in the resident area information is coincident with subscriber information through information exchange with the UE 100, to thereby discriminate whether or not qualification to use local communication is given. In this case, the PCRF 410, the OCS 420 or the SPR 430 may transmit the process distribution instruction if a user using the relevant UE 100 is qualified, whereas not transmit the process distribution instruction if not qualified. The PCRF 410, the OCS 420 and the SPR 430 can transmit or not transmit the process distribution instruction on a user-by-user basis.

Also, the PCRF 410, the OCS 420 and the SPR 430 may include the PCC information of the relevant UE 100 in the process distribution instruction, so as to transmit to the L-PCRF 610, the L-OCS 620 and the L-SPR 630, respectively. For example, it is also possible for the L-PCRF 610, the L-OCS 620 and the L-SPR 630 to execute the PCC control in local communication on the basis of such PCC information. The PCC information, which is information related to policy control and charging control to be applied to the communication via core of the UE 100, may include, for example, policy and a quota to be applied, or the like.

Further, the PCRF 410, the OCS 420 and the SPR 430 may include a PCC-related software processing in the process distribution instruction, so as to transmit to the L-PCRF 610, the L-OCS 620 and the L-SPR 630, respectively. This enables, for example, the base station side PCC 600 to execute the functions of the L-PCRF 610, the L-OCS 620 and the L-SPR 630, or upgrade the version of each PCC function.

The L-PCRF 610, the L-OCS 620 and the L-SPR 630 perform policy control and charging control for local communication of the UE 100 according to the process distribution instruction, for example.

Additionally, in FIG. 21, the eNB 200 or the MME 800 may transmit the resident area information to the PCRF 410 without transmitting the resident area information to the OCS 420 and the SPR 430, so that may distribute the resident area information of concern from the PCRF 410 to the OCS 420 and the SPR 430.

By the above PCC distributed processing, for example, the base station side PCC 600 can perform the PCC control for local communication.

5.2 Bearer Establishment Operation

In the base station side PCC 600, EPS bearer establishment processing is performed when the PCC control becomes possible. In this case, there are an EPS bearer on the communication via core side and an EPS bearer on the local communication side.

For example, the EPS bearer on the communication via core side is a logical route of information communication from the UE 100 to the PGW 300, whereas the EPS bearer on the local communication side is a logical route of information communication from the UE 100 to the GW 210 (or the application server 500). The ICPT 230 can, for example, count a data usage from a time point when the EPS bearer of the local communication side is established.

In the EPS bearer, there are an EPS Default Bearer and an EPS Dedicated bearer. The EPS dedicated bearer can additionally be set if it is not sufficient to maintain QoS (Quality of Service) by the EPS default bearer only. This enables, for example, the setting of a bearer according to a service, and the provision of a service in which constant quality is maintained.

In the following, the EPS bearer may simply be referred to as bearer. The EPS default bearer and the EPS dedicated bearer may also be referred to as default bearer and dedicated bearer, respectively.

In the following, mainly in regard to the bearer establishment operation on the local communication side, a description will be given by separating into two, which are default bearer establishment operation and dedicated bearer establishment operation.

5.2.1 Example of Default Bearer Establishment Operation

Figure 22:
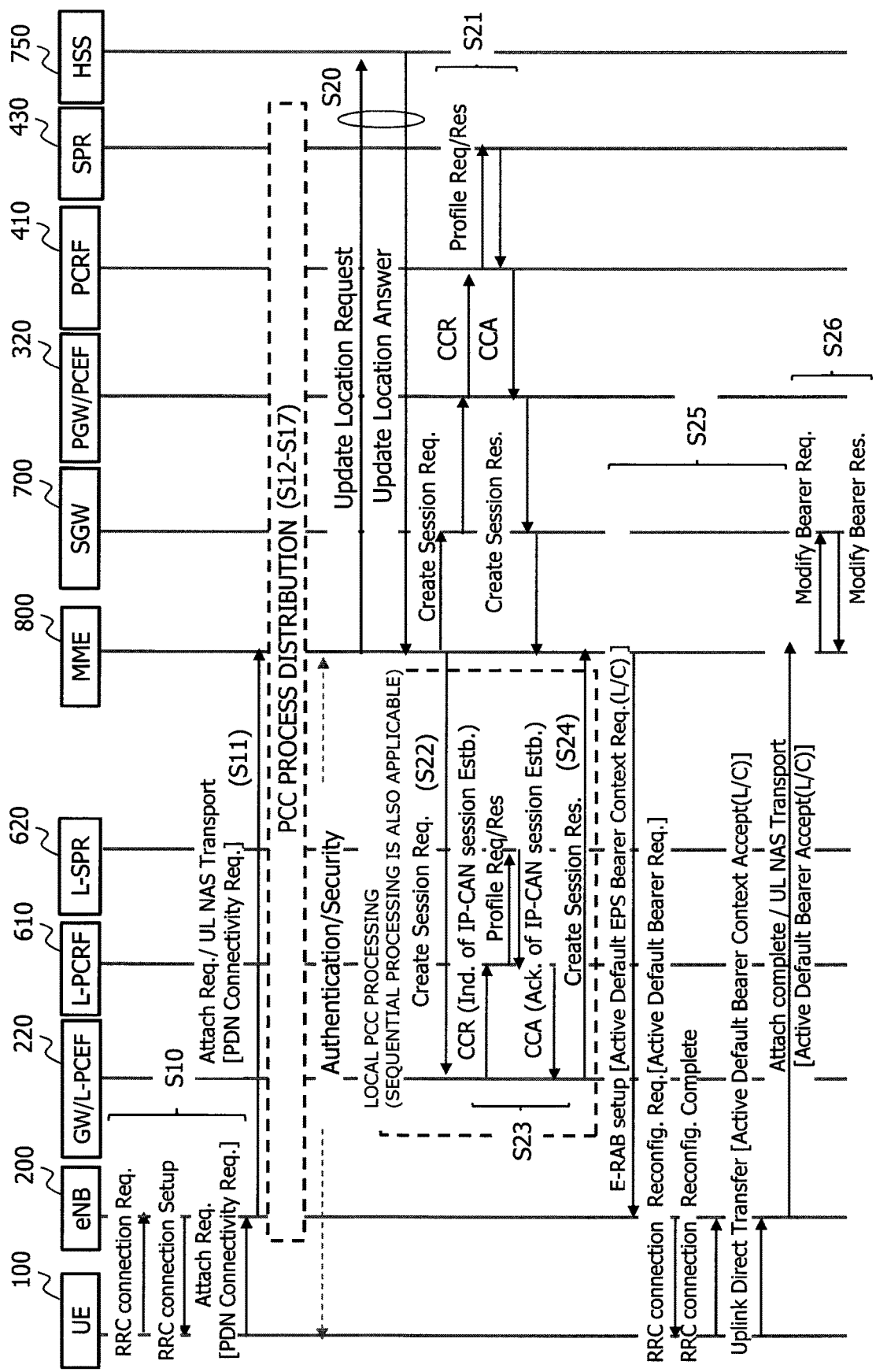
FIG. 22 is a diagram illustrating a sequence example of default bearer establishment operation.

FIG. 22 represents a sequence example of the default bearer establishment operation. In the example of FIG. 22, there is represented an example in which default bearer establishment processing on the local communication side is performed in parallel with default bearer establishment processing on the communication via core side.

The sequence example of FIG. 22 includes the initial registration processing of the UE 100 (S10, S11) and the PCC distributed processing (S12-S17).

On completion of the PCC distributed processing, the MME 800 exchanges messages for the UE 100 related to the change of the MME 800 between with an HSS (Home Subscriber Server: subscriber management server) 750 (S20). An example of such a message includes Update Location Request and Location Answer.

Next, the MME 800 exchanges a series of messages to establish an EPS session on the communication via core side (S21). An example of such a message includes Create Session Request, Create Session Response, etc.

Here, the PCEF 320 of the PGW 300 exchanges with the PCRF 410 a CCR (Credit Control Request) message and a CCA (Credit Control Answer) message of the Diameter protocol. The exchange of the CCR message, the CCA message, etc. enables, for example, the PCEF 320 to receive the instructions of the policy rule and the charging rule for the relevant user from the PCRF 410.

Also, the PGW 300, on receiving the CCA message, can set the default bearer of the communication via core side between with the UE 100.

On the other hand, on the local communication side, the MME 800 transmits a message for establishing an EPS bearer session for the local communication side, similar to the communication via core side (S22). An example of such a message includes Create Session Request. The MME 800 transmits the above message to the GW 210.

The GW 210, on receiving the message, notifies the L-PCEF 220 to that effect, so that the L-PCEF 220 exchanges a series of messages to receive the instructions of the policy rule and the charging rule of the UE 100 from the L-SPR 630 (S23). In this case also, the L-PCEF 220 may perform the message exchange of the CCR message and the CCA message between with the L-PCRF 610.

When the L-PCEF 220 receives the CCA message, for example, a notification of information related to the received policy is given from the L-PCEF 220 to the GW 210, and based on the above information, the GW 210 sets a default bearer on the local communication side between with the UE 100. Then, the L-PCEF 220 transmits a message indicating that the session has been established (or the default bearer has been established) to the MME 800 (S24). An example of such a message includes Create Session Response.

Additionally, the local PCC processing (S22-S24) may be processed sequentially with default bearer set processing (S20, S21) on the communication via core side, for example. Namely, the processing from S22 to S24 may be performed after S21 is completed, or the processing from S20 to S21 may be processed after the processing from S22 to S24 is completed.

Next, the MME 800 exchanges information related to the set default bearer with the UE 100 through the eNB 200 (S25). As examples of messages to be used for such information exchange, there are E-RAB setup, RRC Connection Reconfiguration Request (or complete), Uplink Direct Transfer, Attach complete/UL Nas Transport, etc.

The MME 800, on receiving a message related to initial registration completion (for example, Attach complete/UL Nas Transport) from the UE 100, exchanges a message (for example, Modify Bearer Request (or Response)) related to the set or update of the bearer (S26).

Thus, for example, the default bearer of the local communication is established between the UE 100 and the GW 210, and the default bearer of the communication via core is established between the UE 100 and the PGW 300.

Additionally, an Active Default EPS Bearer Context Request message in S25, though described as being collectively transmitted for the entire EPS bearers, may be transmitted individually for each bearer. Therefore, there is a case that a plurality of relevant messages are transmitted.

Figure 23:
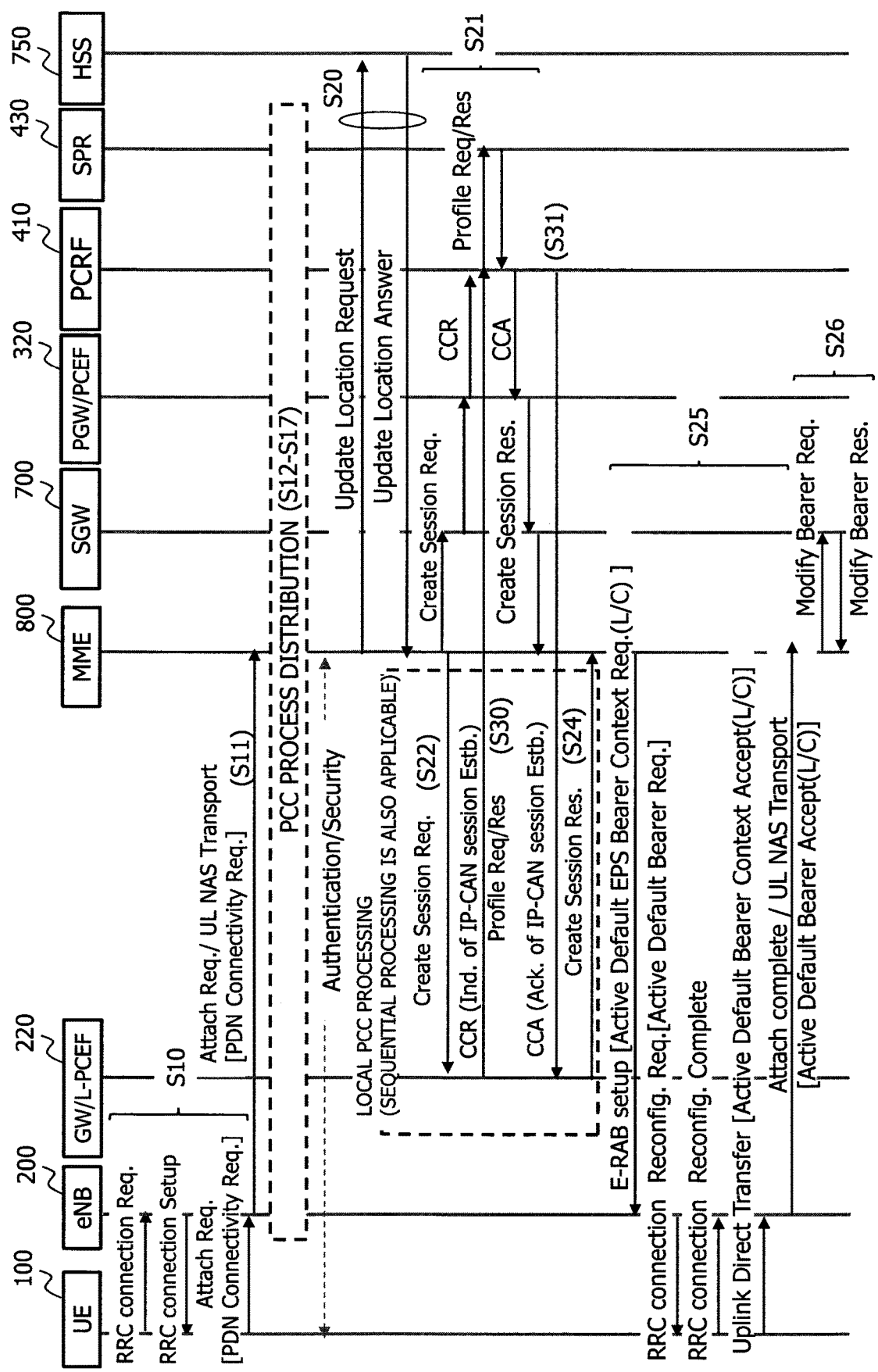
FIG. 23 is a diagram illustrating a sequence example of default bearer establishment operation.

FIG. 23 represents a sequence example of default bearer establishment operation when the base station side PCC 600 is not included in the communication system 10. For example, there is represented an operation example in the communication system 10 when the ICPT 230 is included in the first configuration example (for example, FIG. 2).

In this case, the L-PCEF 220, on receiving Create Session Request from the MME 800 (S22), exchanges messages related to Diameter with the PCRF 410 on the communication via core side (S30, S31). On receiving instructions of the policy rule and the charging rule from the PCRF 410, the L-PCEF 220 transmits to the MME 800 a response message to S22 (S24).

Also in the example depicted in FIG. 23, the local PCC processing (S22, S30, S31, S24) may be processed sequentially with the default bearer establishment operation (S20, S21) on the communication via core side.

The operation example depicted in FIG. 23 is effective, for example, when there is no PCC-related node on the local communication side.

5.2.2 Example of Dedicated Bearer Establishment Operation

Figure 24:
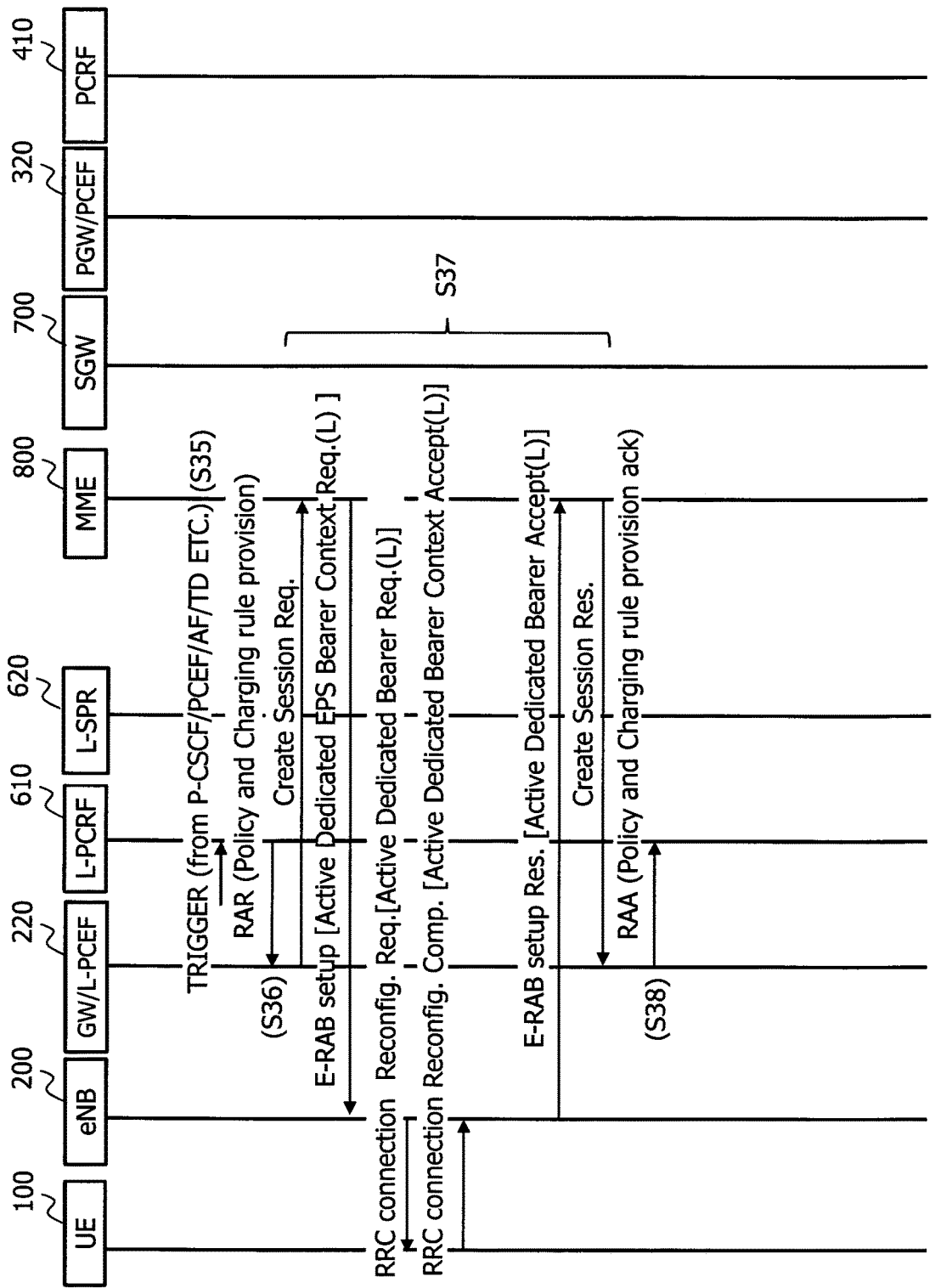
FIG. 24 is a diagram illustrating a sequence example of dedicated bearer establishment operation.

FIG. 24 represents a sequence example of dedicated bearer establishment operation for the local communication.

The L-PCRF 610, when receiving a message from an IMS (IP Multimedia Subsystem)-related node (S35), transmits a policy rule and a charging rule to the L-PCEF 220 (S36).

As the IMS-related node, for example, there is P-CSCF (Proxy-Call Session Control Function). It may also be possible to operate, as a node other than the IMS-related node, using each signal from the PCEF, the AF and the TDF as a trigger. Also, the L-PCRF 610 may transmit the policy rule and the charging rule using RAR (Re-Auth-Request) of the Diameter protocol.

Thereafter, the L-PCEF 220 or the GW 210 transmits Create Session Request to the MME 800, so that messages related to dedicated bearer setting are exchanged between the MME 800 and the UE 100 (S37).

Then, when the L-PCEF 220 or the GW 210 receives Create Session Request from the MME 800, the L-PCEF 220 transmits to the L-PCRF 610 a response message to S36 (S38). As the response message, there is RAA (Re-Auth-Answer) of the Diameter protocol.

In this case, for example, on receiving Create Session Request, the GW 210 may set the dedicated bearer of local communication to the UE 100.

Thus, the dedicated bearer on the local communication side is established between the UE 100 and the GW 210.

Additionally, in FIG. 24, an Active Dedicated EPS Bearer Context Request message in S37, though described as being collectively transmitted for the entire EPS bearers, may be transmitted individually for each bearer. Therefore, there is a case that a plurality of relevant messages are transmitted.

Thus, the default bearer and the dedicated bearer are set on the local communication side. By the setting of the bearer on the local communication side, the ICPT 230 can monitor the overall communication and count a data amount.

5.3 Example of PCC Control

Next, a description will be given of a case when PCC control is performed on the local communication side after the setting of the bearer. First, an example of PCC control on the local communication side is described, and next, examples of distributed PCC control and centralized PCC control are described. Here, the example of the distributed PCC control is performed in the communication system 10 of the third configuration example. On the other hand, the example of the centralized PCC control may be performed in the communication system 10 when the ICPT 230 is added to the first configuration example.

5.3.1 Example of PCC Control on the Local Communication Side

Figure 25:
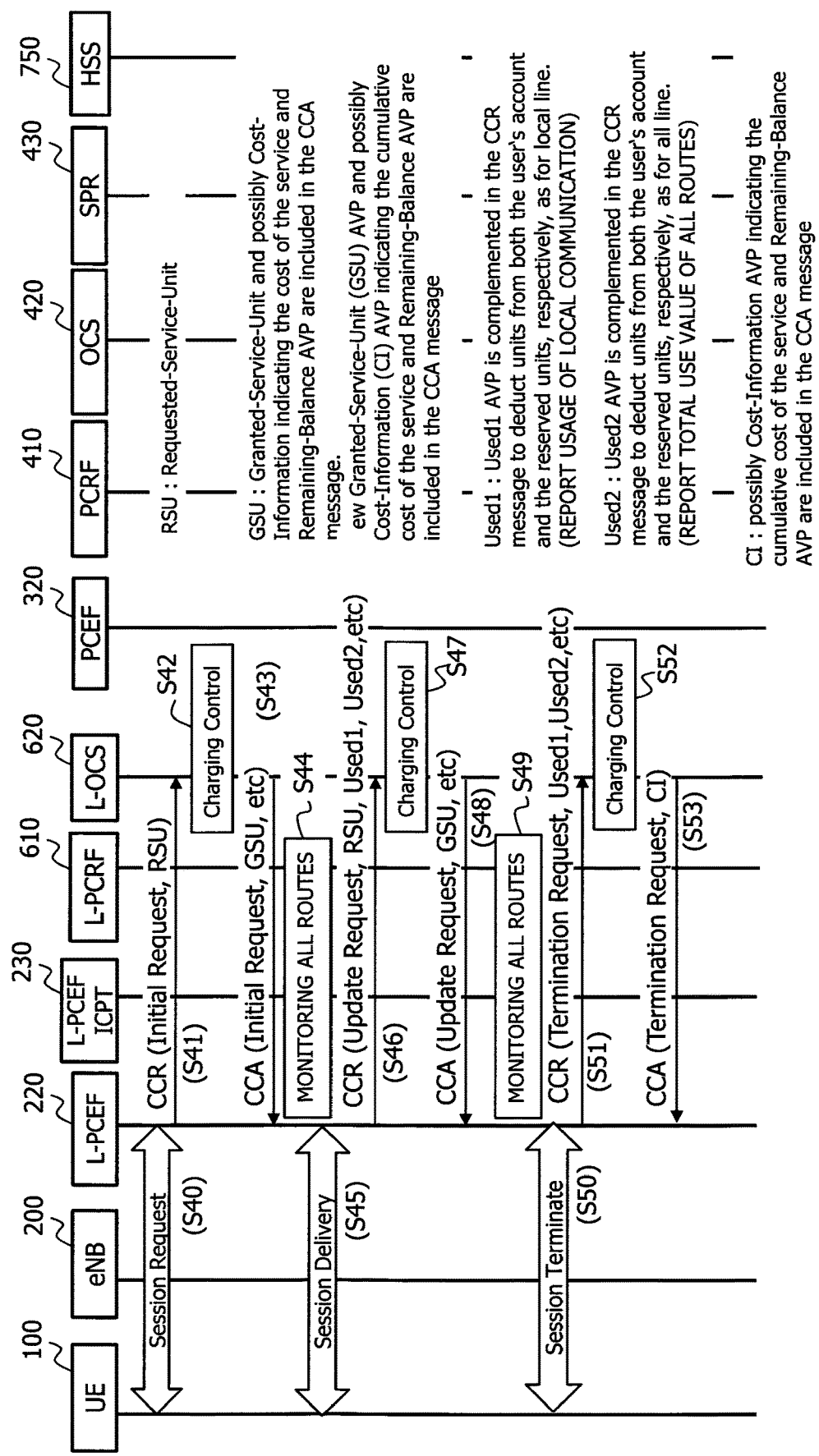
FIG. 25 is a diagram illustrating a sequence example of PCC control.
Figure 26:
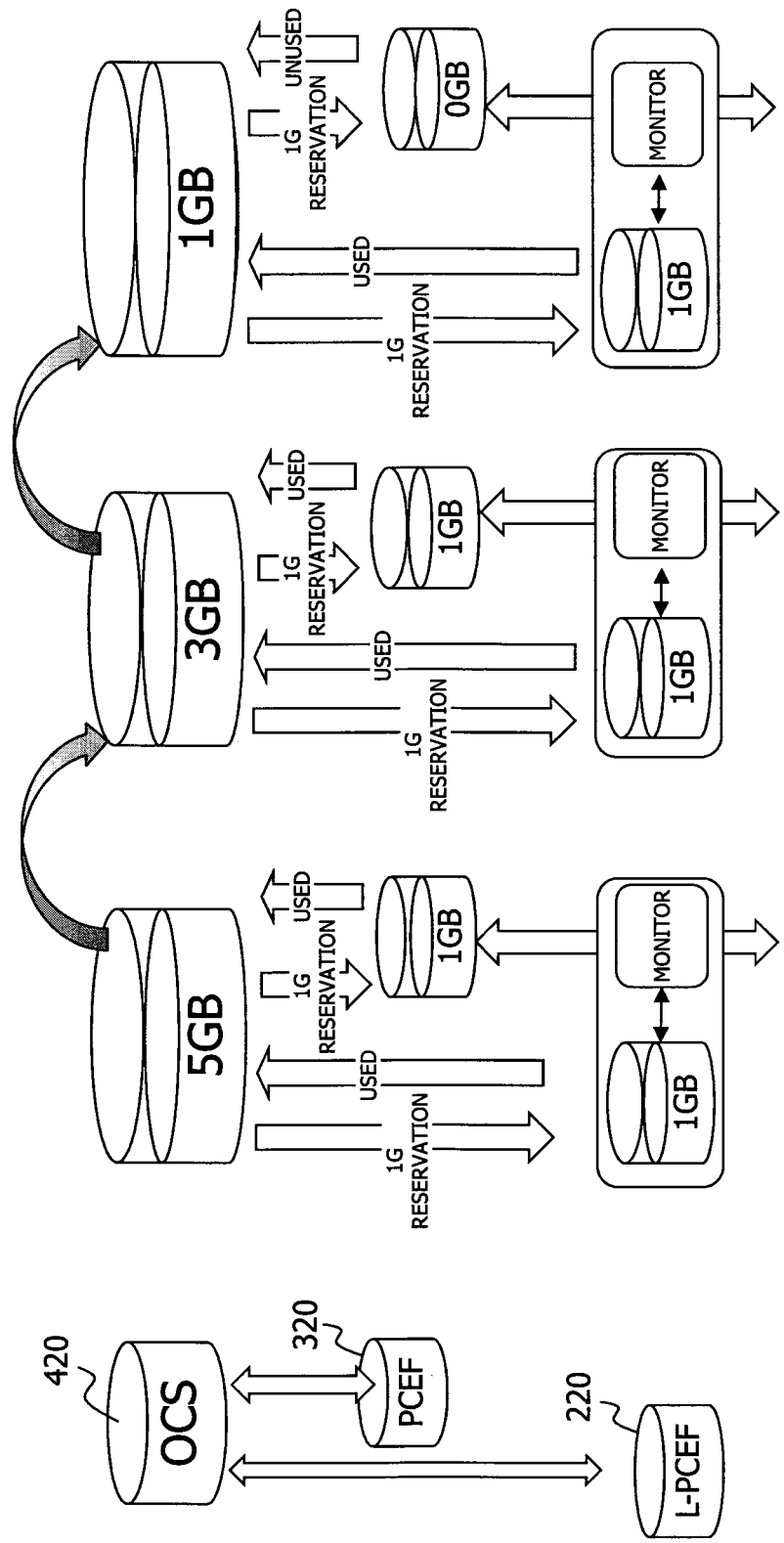
FIGS. 26A-26D are diagrams illustrating examples of modeling a data usage.
Figure 27:
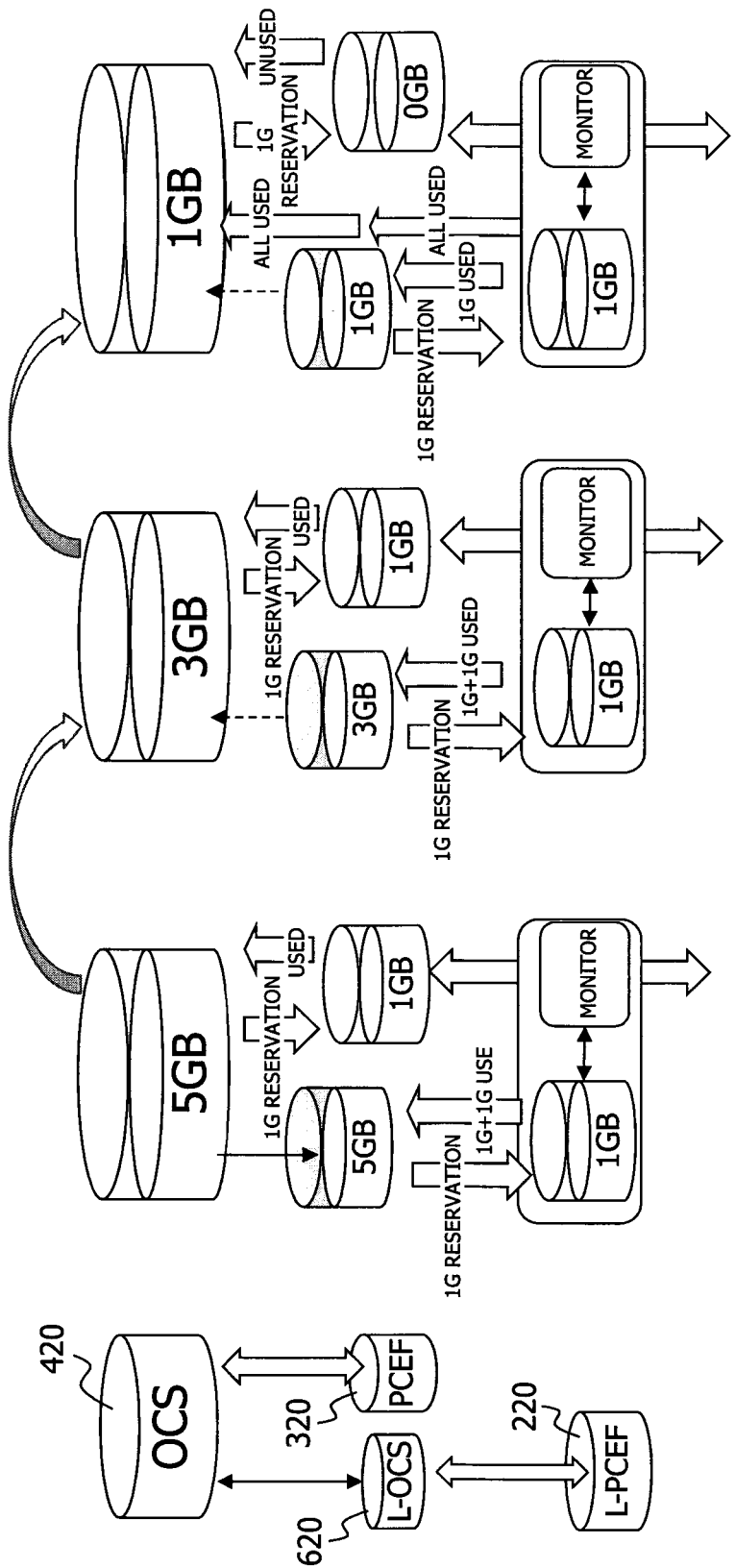
FIGS. 27A-27D are diagrams illustrating examples of modeling a data usage.

FIG. 25 represents an example of PCC control on the local communication side, and FIGS. 26(A) to 27(D) respectively represent examples of modeling of data usage management. First, a modeling example of data usage management will be described, and next an operation example of the PCC control on the local communication side will be described.

The examples of FIGS. 26(A) to 26(D) are examples of the communication system 10 including the ICPT 230 added to the first configuration example, for example. In this case, the OCS 420 reserves (or dispenses) a data usage for two, which are the PCEF 320 and the L-PCEF 220.

In the examples of FIGS. 26(A) to 26(D), the ICPT 230 counts the data usage of the overall communication. As described above, the ICPT 230 counts at the intercept point, and therefore can count the data usage of the overall communication.

FIGS. 27(A) to 27(D) also represent examples of modeling of the data usage management. In these examples, for example, the communication system 10 of the third configuration example is exemplified. As to the data usage of the local communication, the L-OCS 620 dispenses. In this case also, the ICPT 230 can count the data usage of the overall communication at the intercept point.

Next, a sequence example of the PCC control on the local communication side will be described by use of FIG. 25. The present sequence example represents an example in each stage of session request (or start of communication) (S40), session distribution (or during communication) (S45) and end of session (or end of communication) (S50).

After the session request is completed (S40), the L-PCEF 220 requests a data usage in the local communication, and after charging control is performed in the L-OCS 620, receives the dispensing of the data usage (S41-S43). A request data usage can be designated by "RSU" of a CCR message, and a data usage can be designated by "GSU" of a CCA message.

Then, after bearer establishment, the ICPT 230 starts monitoring the data usage of the overall communication.

During session distribution (S45), the L-PCEF 220 detects the data usage of the relevant UE 100 in regard to the local communication, and if the data usage exceeds the reserved data usage, the L-PCEF 220 requests a data usage from the L-OCS 620 (S46).

In this case, in the CCR message which the L-PCEF 220 transmits to the L-OCS 620, "Used1" and "Used2" are included. For example, "Used1" represents a data usage of the local communication, whereas "Used2" represents the total value of the data usage of the overall communication.

The ICPT 230 appropriately notifies the total value of the counted data usage of the overall communication to the L-PCEF 220. Therefore, the L-PCEF 220 can insert the notified total value of the data usage of the overall communication into the item "Used2". The "Used1", for example, becomes the data usage of the local communication counted by the L-PCEF 220.

Then, charging control is performed in the L-OCS 620 (S47), and the L-PCEF 220 receives the dispensing of the data usage (S48). The ICPT 230 monitors the data usage of the overall communication successively from S44 (S49).

Additionally, in FIG. 25, although the description is given of a case that each of the CCR message and the CCA message is transmitted once during the session distribution (S45), the CCR message and the CCA message may be exchanged for a plurality of times. In this case, the L-PCEF 220 may transmit the CCR message whenever using the data usage for which the reservation is received.

At the end of the session (S50), the L-PCEF 220 transmits to the L-OCS 620 a CCR message which includes the data usage of the local communication (for example, "Used1") and the data usage of the overall communication (for example, "Used2") (S51). The data usage of the overall communication used by the relevant user is inserted into the "Used2" and notified to the L-OCS 620.

Then, the charging control is performed in the L-OCS 620 (S52), and the L-PCEF 220 receives a CCA message, including cost information (for example, "CI") with respect to the overall communication, from the L-OCS 620 (S53).

The cost information comes to cost information associated with the data usage of the overall communication from the start of the session (S40) to the end of the session (S50).

The L-PCEF 220 transmits the data usage of the overall communication, and therefore, the L-OCS 620 can easily calculate the cost information thereof on the basis of the data usage of the overall communication.

5.3.2 Example of Distributed PCC Control

Figure 28:
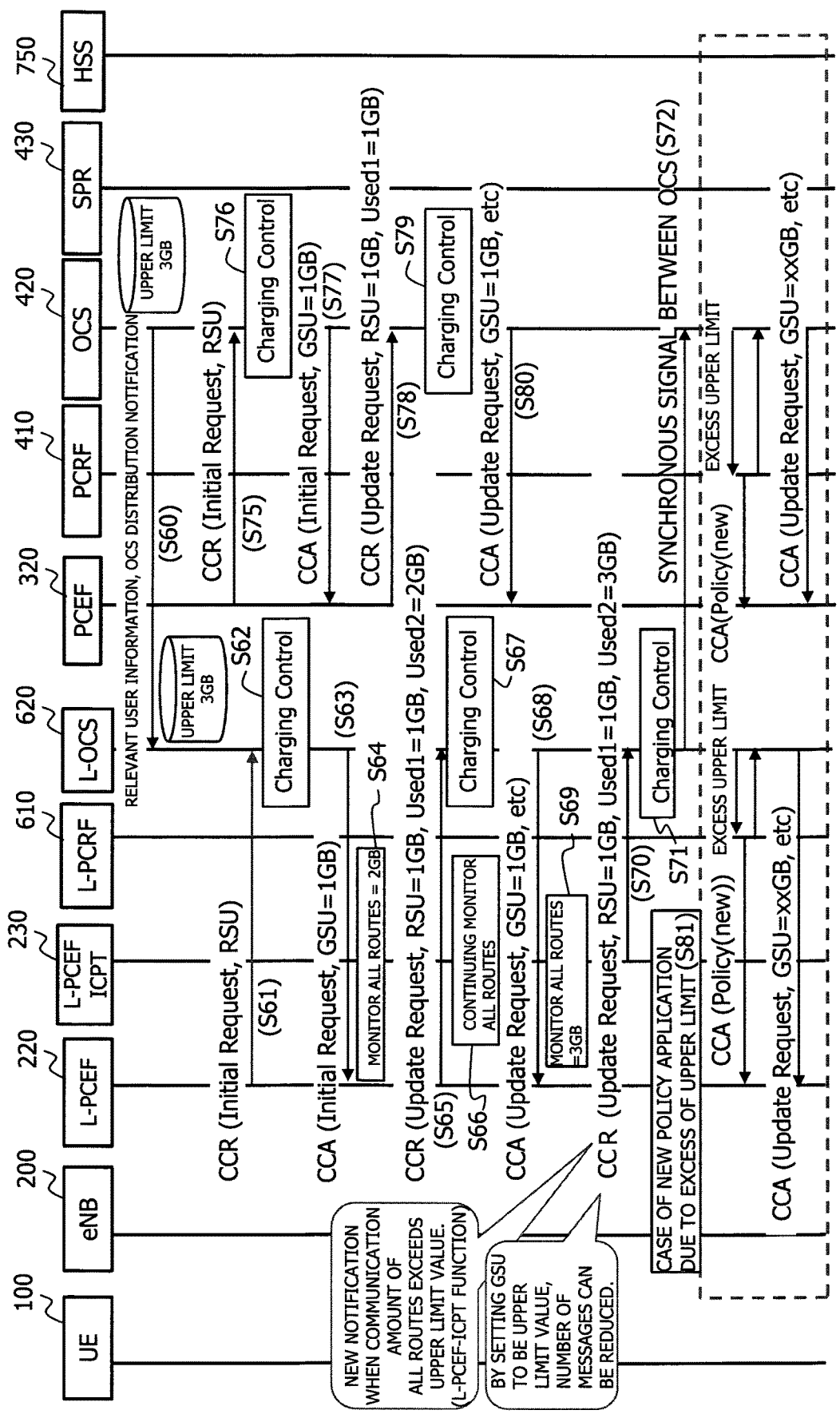
FIG. 28 is a diagram illustrating a sequence example of PCC control.

FIG. 28 represents an example of distributed PCC control.

First, the OCS 420 transmits to the L-OCS 620 a process distribution notification for the L-OCS 620 (S60). In the process distribution notification, relevant user information related to the relevant user may be included, for example. Further, in the relevant user information, "3 GB" i.e. the upper limit value of the relevant user may be included.

The L-PCEF 220 transmits to the L-OCS 620 a CCR message as an initial request to the L-OCS 620 (S61). The L-OCS 620 performs charging control (S62) to dispense "1 GB" to the L-PCEF 220 (S63).

The ICPT 230 starts to monitor the data usage of the overall communication, and counts "2 GB" as the total value of the data usage (S64). For example, the ICPT 230 notifies the L-PCEF 220 of the counted "2 GB".

The L-PCEF 220 detects that the dispensed "1 GB" has been used as a data usage on the local communication side. The L-PCEF 220 transmits a CCR message including "1 GB", which is the data usage on the local communication side, in "Used1", and "2 GB" which is the data usage of the overall communication in "Used2", respectively, and requesting "1 GB" as a data usage (S65).

Next, charging control is performed in the L-OCS 620 (S67), and the L-PCEF 220 receives the dispensed "1 GB" (S68).

The ICPT 230 continues monitoring the overall communication (S66), and as the total value of the data usage of the overall communication, counts "3 GB" (S69).

At this time, because the data usage of the overall communication reaches the upper limit value (or the data usage of the overall communication exceeds the upper limit value), the ICPT 230 notifies the L-OCS 620 with a CCR message (S70). This CCR message includes "1 GB", which is the data usage on the local communication side, as "Used1", and "3 GB", which is the total value of the data usage of the overall communication, as "Used2".

Next, the L-OCS 620 performs charging control (S71) and transmits a synchronous signal (or a synchronous message) to the OCS 420 on the communication via core side (S72).

As such, in the present communication system 10, when the data usage of the overall communication exceeds the upper limit value, synchronization is executed between the OCS 420 and the L-OCS 620, and in that case, only one-time interaction is performed between the OCS 420 and the L-OCS 620.

As to the PCC control on the communication via core side, the PCEF 320 initially receives the dispensed "1 GB" from the OCS 420 (S75-S77), and after using the dispensed "1 GB", again requests "1 GB", so as to receive the dispensed "1 GB" (S78-S80).

At the stage of "2 GB" of the data usage of the overall communication (S64), the residual amount of the data usage of the overall communication is "1 GB". Therefore, if both the local communication side and the communication via core side make requests for data usage (S65, S78), in some cases, the OCS 420 and the L-OCS 620 may dispense a half of "1 GB" to the local communication side and the communication via core side.

However, according to the present second embodiment, the data usage of the overall communication can be calculated in the ICPT 230. Therefore, the OCS 420 may dispense the remaining residual amount of "1 GB" to the PCEF 320 without change. In this case, the data usage of the overall communication is monitored on the local communication side, and when exceeding the upper limit value, the synchronous signal is transmitted to the OCS 420 of the communication via core side from the local communication side, so that the data usage is adjusted.

Thereafter, because of the excess of the upper limit value, a new policy is applied (S81).

5.3.3 Example of Centralized PCC Control

Figure 29:
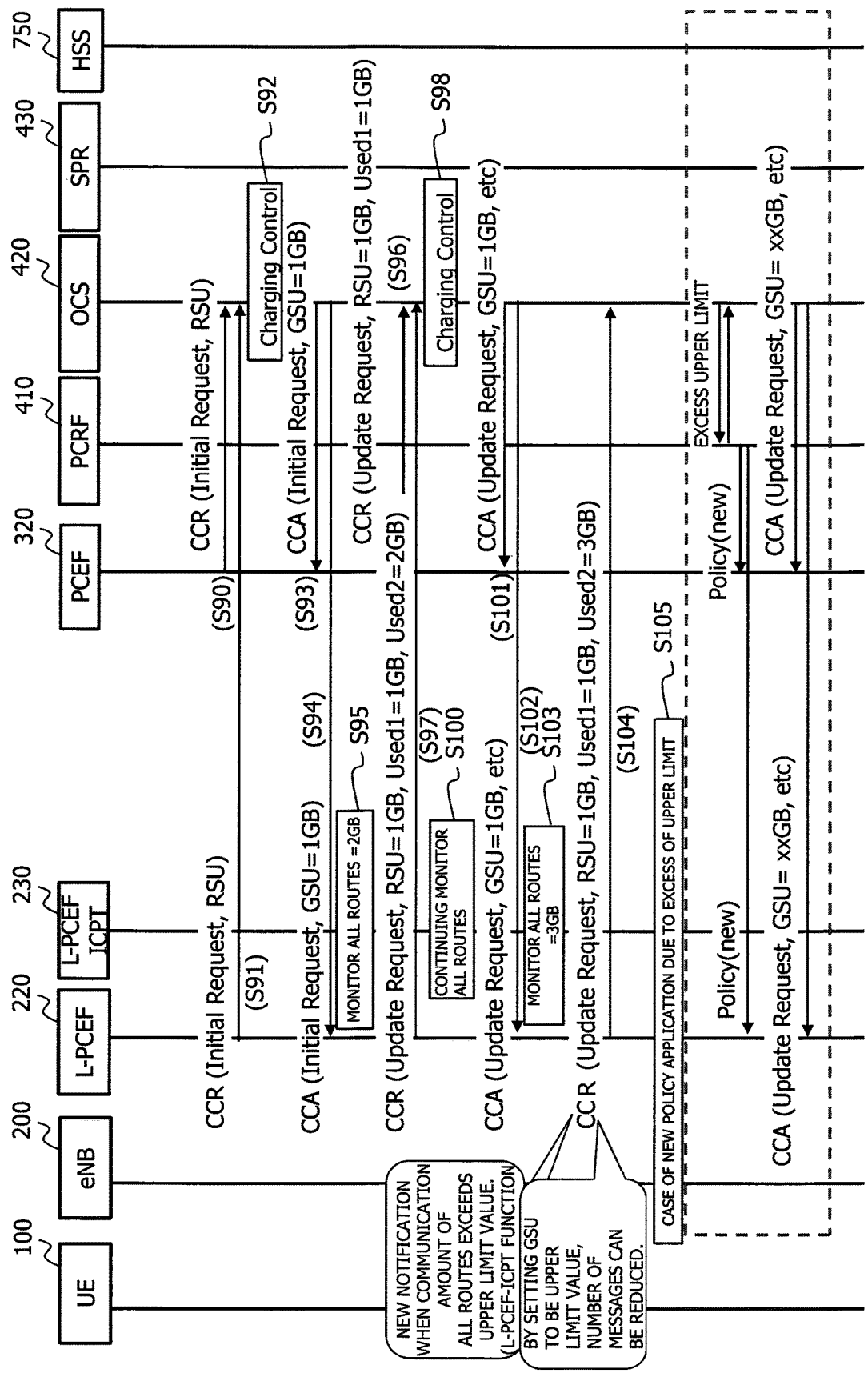
FIG. 29 is a diagram illustrating a sequence example of PCC control.

FIG. 29 represents an example of centralized PCC control. In the distributed PCC control, the L-PCEF 220 exchanges messages with the L-OCS 620, whereas in the centralized PCC control, the L-PCEF 220 directly exchanges messages with the OCS 420 on the communication via core side (S91, S94, S97, S102, S104).

The ICPT 230 monitors the overall communication (S95, S100), to appropriately notify the data usage of the overall communication to the L-PCEF 220, and the L-PCEF 220 transmits the data usage of the overall communication to the OCS 420 (S97). In a CCR message, "Used2" is included as the data usage of the overall communication.

The ICPT 230, when the counted data usage of the overall communication exceeds the upper limit value, notifies the counted data usage to the L-PCEF 220, so that the L-PCEF 220 transmits the CCR message (S104). In this CCR message, there are included "1 GB" as "Used1" and "3 GB", which is the counted total value, as "Used2".

Thereafter, a new policy is applied on the local communication side and the communication via core side (S105).

In the case of the centralized PCC control, messages are notified from the base station network to the core network for a plurality of times (S91, S94, S97, S102 and S104). Therefore, the example of the centralized PCC control is effective when it is not needed to sufficiently take into account a communication load and a transmission delay between the L-PCEF 220 and the OCS 420.

5.3.4 Other PCC Processing Examples

Next, other operation examples of the distributed PCC control and the centralized PCC control will be described.

In the example of the distributed PCC control described above (for example, FIG. 28), the example of the notification of the synchronous signal between the L-OCS 620 and the OCS 420 has been described.

Figure 30:
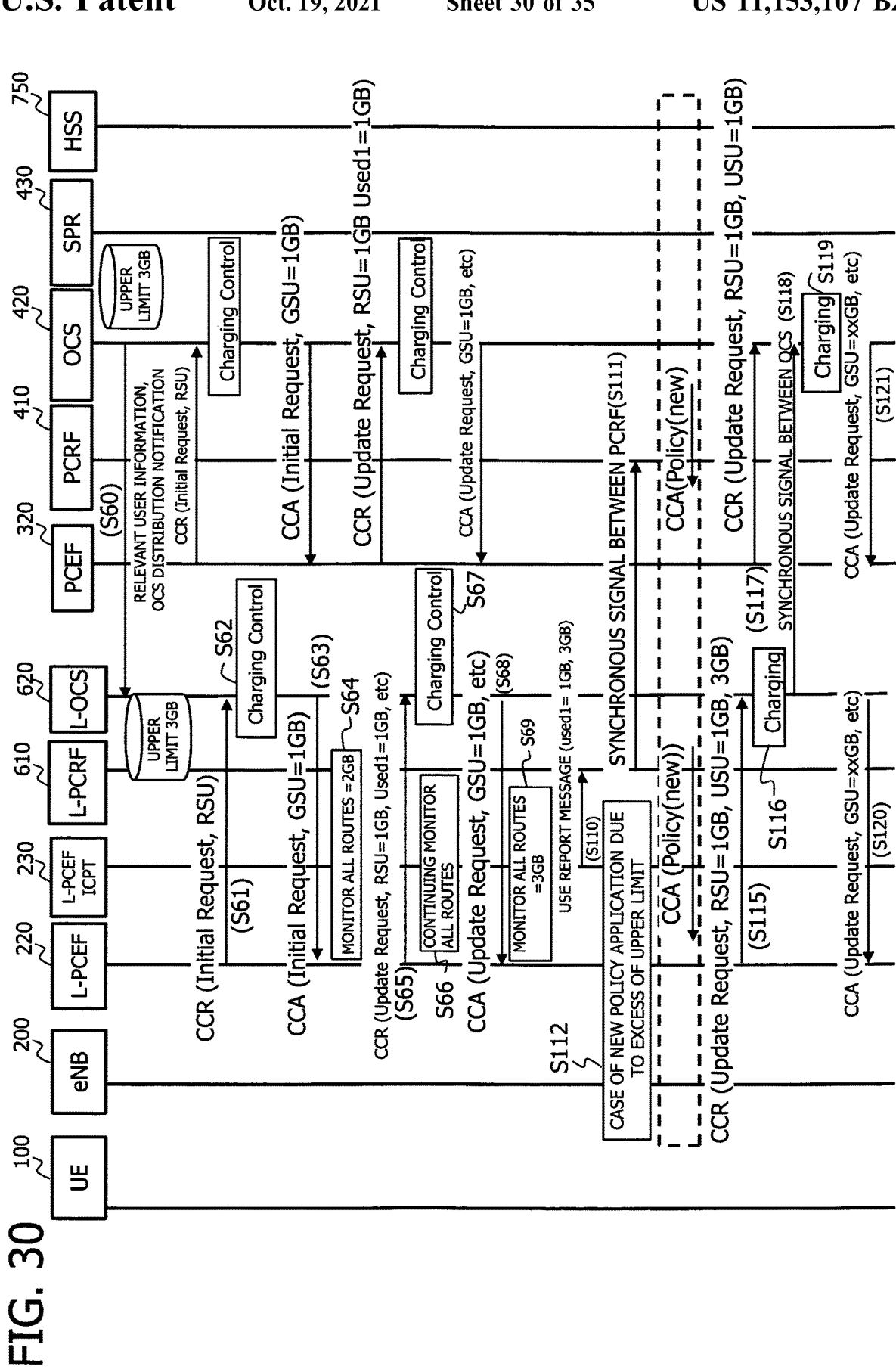
FIG. 30 is a diagram illustrating a sequence example of PCC control.

For example, the synchronous signal may be notified between the L-PCRF 610 and the PCRF 410. FIG. 30 represents a sequence example in this case.

In the example depicted in FIG. 30, when the data usage of overall communication exceeds the upper limit value, the ICPT 230 transmits a use report message to the L-PCRF 610 (S110), and the L-PCRF 610 transmits a synchronous signal to the PCRF 410 (S111).

In this case, the use report message (S110) includes the data usage of the local communication ("1 GB") and the data usage of the overall communication ("3 GB"). The L-PCRF 610 receives such a use report message, so that can grasp that the data usage of the overall communication exceeds the upper limit value. Then, the L-PCRF 610 transmits the synchronous signal to the PCRF 410, so that can notify the communication via core side that the data usage exceeds the upper limit value.

FIG. 30 represents an example that, after the new policy is applied, the local communication side and the communication via core side receive the dispensing of the data usage while synchronization is performed between the L-OCS 620 and the OCS 420 (S115-S121).

Figure 31:
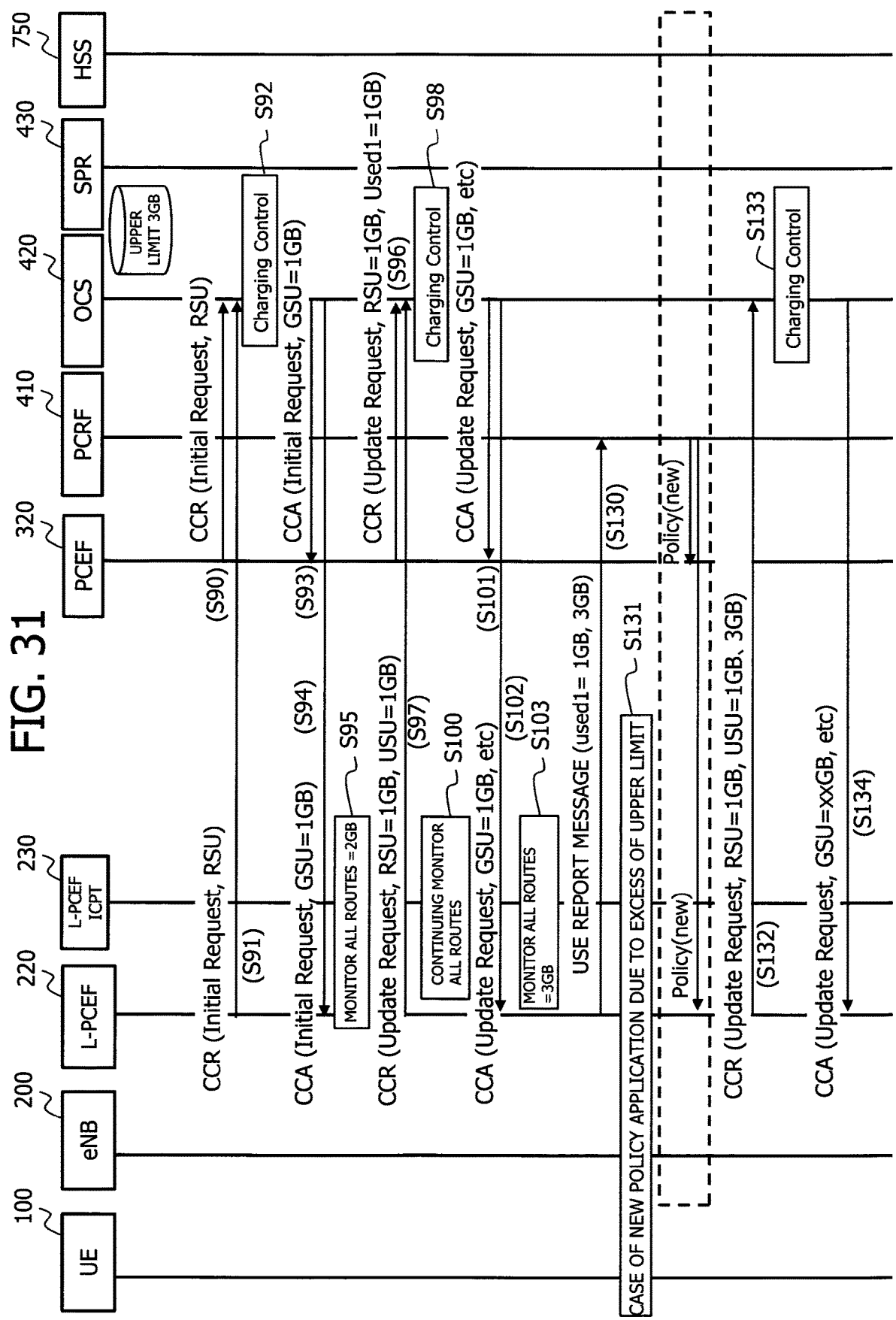
FIG. 31 is a diagram illustrating a sequence example of PCC control.

FIG. 31 represents another sequence example of the centralized PCC control. In this case, the L-PCEF 220 transmits a use report message to the PCRF 410 (S130). For example, when the total value of the data usage of the overall communication exceeds "3 GB", the ICPT 230 may notify the L-PCEF 220 of the total value, so that the L-PCEF 220, on receiving the notification, may transmit a use report message.

The PCRF 410 receives this use report message to thereby grasp that the data usage of the overall communication exceeds the upper limit value, so that can apply a new policy to the local communication and the communication via core (S131). Thereafter, the L-PCEF 220 requests a data usage from the OCS 420 to receive the dispensing of the data usage.

In the above, the examples of the distributed PCC control and the centralized PCC control have been described. In the above-mentioned examples of the distributed PCC control and the centralized PCC control, the description has been given of an example that two data usages of "Used1" and "Used2" are included in the CCR message which the L-PCEF 220 or the ICPT 230 transmits. In this case, for example, the "Used1" and "Used2" may be transmitted as different CCR messages. The reason is that there may be a case of a communication protocol where only one item that indicates data usage can be inserted in one message.

6. Operation Example in the Fourth Configuration Example

Figure 32:
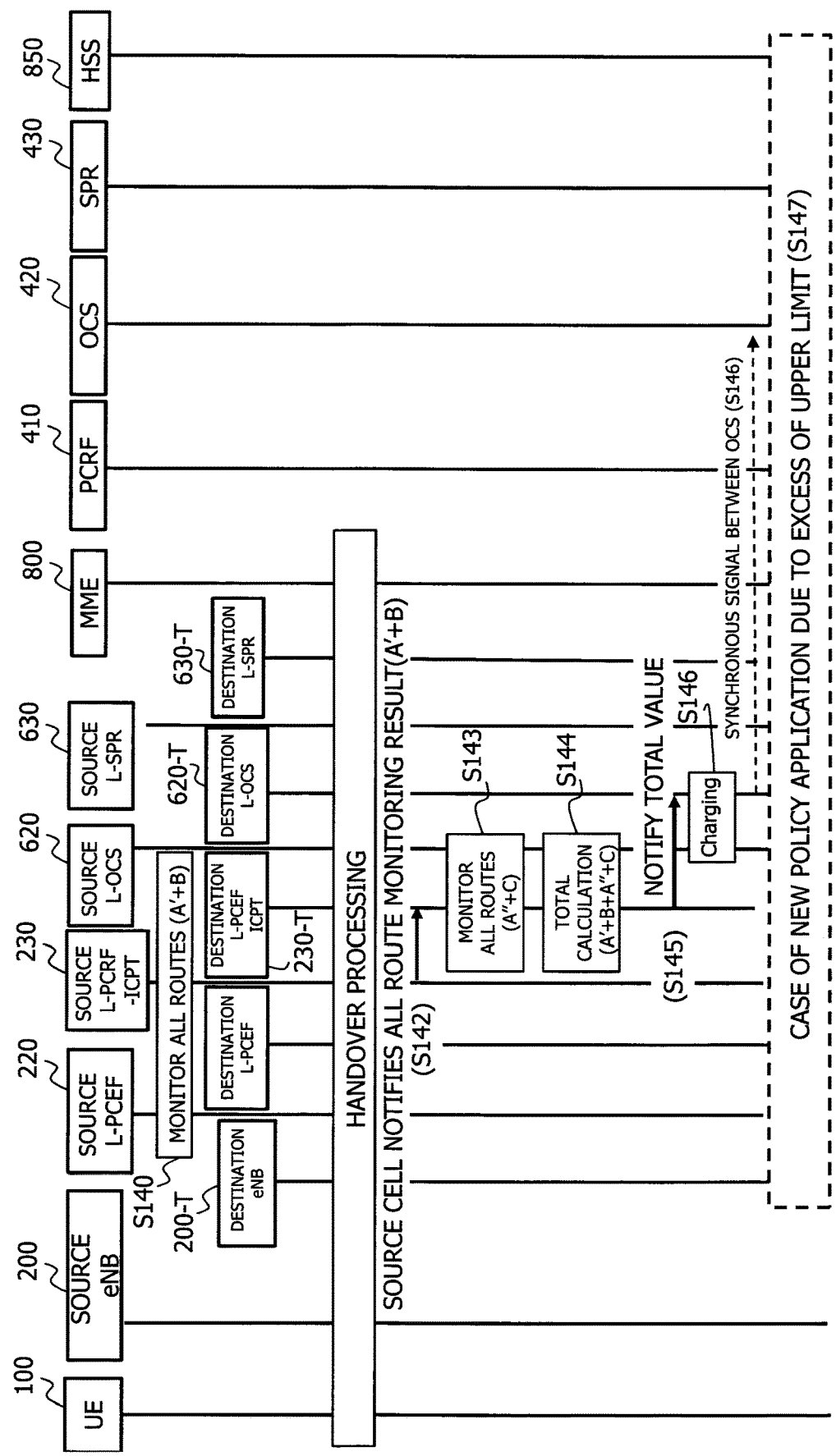
FIG. 32 is a diagram illustrating a sequence example of PCC control at a handover.

FIG. 32 is a diagram illustrating a sequence example in the fourth configuration example. FIG. 32 represents an example of the distributed PCC control.

A handover source ICPT 230 counts the data usage of the overall communication (S140). For example, the handover source ICPT 230 counts "A'+B" by totaling the data usage "B" on the local communication side with the data usage "A'" on the communication via core side.

Then, on completion of the handover processing in the UE 100 and the eNB 200, 200-T (S141), the ICPT 230 transmits a count value (for example, "A'+B") at the time point of the handover completion to a handover destination ICPT 230-T (S142).

The handover destination ICPT 230-T counts the total value of each data usage of the local communication and the communication via core at the handover destination (S143). For example, the handover destination ICPT 230-T counts the total value ("A"+C") of a data usage "C" of the local communication at the handover destination and a data usage "A'"" of the communication via core at the handover destination.

Then, the handover destination ICPT 230-T notifies, to the handover destination L-OCS 620-T, the total value (for example, "A'+A"+B+C") of the entire data usage at the handover source (for example, "A'+B") and the entire data usage at the handover destination (for example, "A"+C") (S145). For example, the ICPT 230 may notify the total value when the calculated total value (S144) exceeds the upper limit value (S145).

The handover destination L-OCS 620-T, on receiving the above notification, performs charging control (S146), and transmits a synchronous signal to the OCS 420 on the communication via core side (S146). By this synchronous signal, the OCS 420 can grasp that the data usage of the overall communication exceeds the upper limit value, so that can apply a new policy to the relevant user (or the UE 100) (S147).

Figure 33:
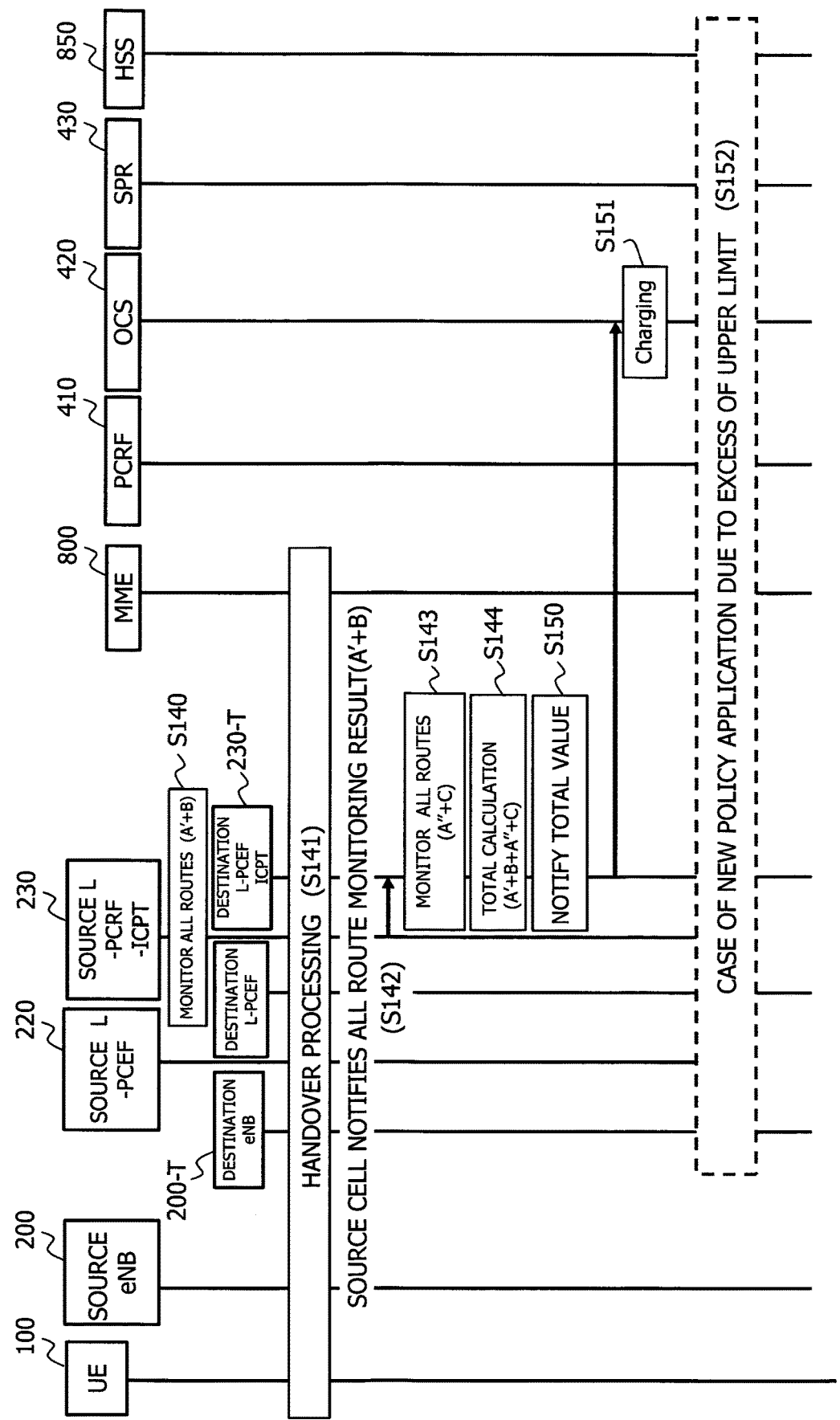
FIG. 33 is a diagram illustrating a sequence example of PCC control at a handover.

FIG. 33 represents an example of the centralized PCC control. In this case also, the handover source ICPT 230 counts the data usage of the overall communication (S140), and transmits the count result (for example, "A'+B") at the completion of the handover processing to the handover destination ICPT 230-T (S142).

The handover destination ICPT 230-T counts the data usage of the overall communication at the handover destination (S143), to calculate the total value of the overall communication before and after the handover (S144). Then, if the total value exceeds the upper limit value, the handover destination ICPT 230-T transmits the total value to the OCS 420 on the communication via core side (S150).

In both examples of the distributed PCC control and the centralized PCC control, the handover destination ICPT 230-T receives the notification of the data usage from the handover source ICPT 230, so that can succeed the data amount before and after the handover. Therefore, in the communication system 10 of the fourth configuration example, the data amount of the overall communication before and after the handover can be calculated accurately, and a message indicative of the excess of the upper limit value can be transmitted based on the accurate data amount. Accordingly, thereafter, efficient policy control and charging control can be performed.

Third Embodiment

Figure 34:
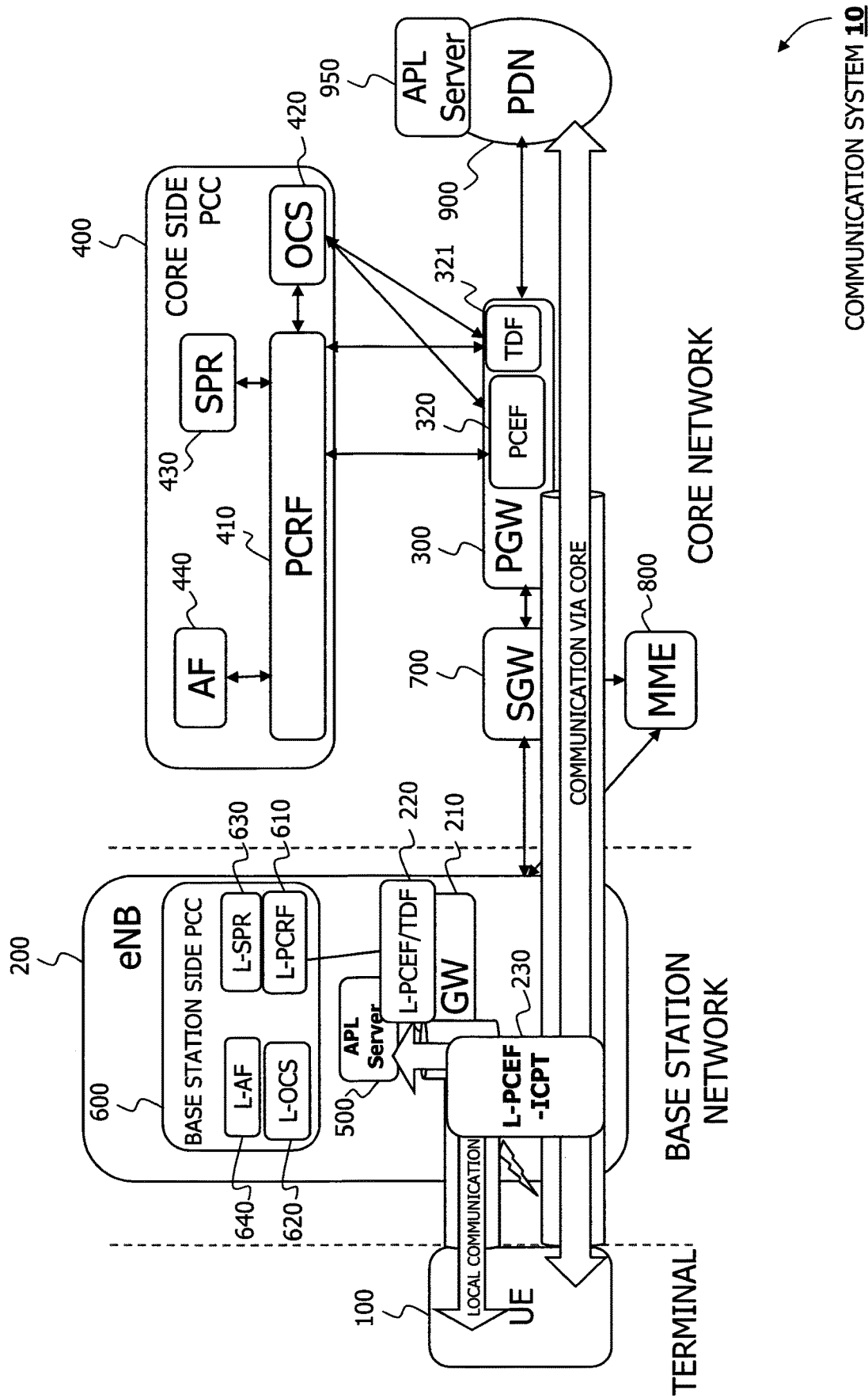
FIG. 34 is a diagram illustrating a configuration example of a communication system.

Next, a third embodiment will be described. FIG. 34 represents a configuration example of the communication system 10 according to the third embodiment. FIG. 34 represents an example in which a base station side PCC 600 is included in the eNB 200.

In this case, in the eNB 200 depicted in FIG. 17, for example, the CPU 207 reads out a program stored in the ROM 206 and executes, so as to execute the function of the base station side PCC 600. Alternatively, the CPU 207, for example, execute the program to execute the functions of the L-PCRF 610, the L-OCS 620, the L-SPR 630 and the L-AF 640 which are included in the base station side PCC 600. Accordingly, the CPU 207 corresponds to, for example, the base station side PCC 600 or the L-PCRF 610, the L-OCS 620, the L-SPR 630 and the L-AF 640.

Each functional entity that executes such PCC control can be achieved by each software program. For example, such a program may have an operation mode of being downloaded from a server etc., on the basis of service provision information (for example, presence or absence of local communication, etc.) and the installation location of the eNB 200 in the communication system 10.

Other Embodiments

Next, other embodiments will be described.

Figure 35:
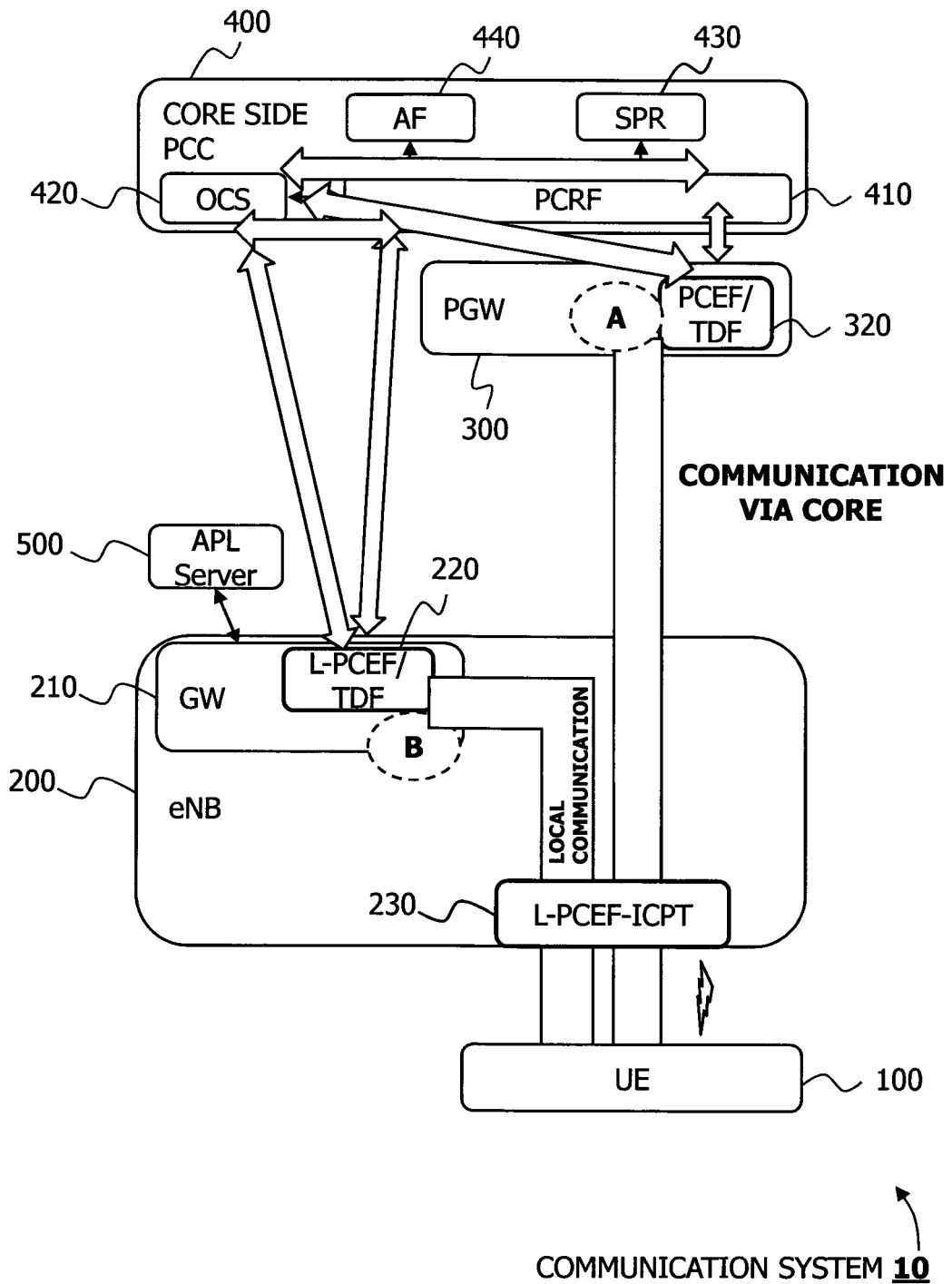
FIG. 35 is a diagram illustrating a configuration example of a communication system.

FIG. 35 represents an example of the communication system 10 which includes the ICPT 230 in the first configuration example. In this case, the ICPT 230 may count the total value of the data usage of the local communication and the communication via core, so that may notify the L-PCEF 220 of the counted result and directly notify the core side PCC.

The communication system 10 depicted in FIG. 35 may be operated by the centralized PCC control having been described in FIGS. 29, 31, 33, etc., for example.

Also, in the second embodiment, the example of setting the EPS bearer (for example, FIGS. 22 to 24) to perform the PCC control for the set EPS bearer (for example, FIGS. 25 to 31) has been described. For example, the communication system 10 may perform the PCC control not only for the EPS bearer but on the basis of each IP traffic flow.

In this case also, the ICPT 230 may count the usage of the entire traffic and transmit the counted total usage to the base station side PCC 600 and the core side PCC 400.

Further, as to the EPS bearer described in the second embodiment, the ICPT 230 may monitor the data usage according to the bearer. For example, the ICPT 230 may count for the dedicated bearer without counting for the default bearer, or may count for the default bearer without counting for the dedicated bearer. Namely, the ICPT 230 may count the data usage of the overall communication related to the dedicated bearer to transmit the total value thereof, or may count the data usage of the overall communication related to the default bearer to transmit the total value thereof. In this case, the ICPT 230 may transmit the data usage of the overall communication of both the dedicated bearer and the default bearer.

Alternatively, it is also possible for the ICPT 230 to count bearer-by-bearer, like counting for the default bearer and the dedicated bearer separately, to transmit the data usage thereof, or to count for each IP traffic flow to transmit the data usage thereof. In this case also, the ICPT 230 may transmit the total data usage of the overall communication together.

Further, in the second embodiment, the description has been given on the PCRF 410, the OCS 420, etc. by exemplifying each existing functional entity specified in the 3GPP etc. Such functional entity may be actualized by any node apparatus, a gateway apparatus etc. and a server apparatus etc., including the L-PCEF/TDF 220 and the L-PCRF 610, included in the base station side PCC 600, etc. Alternatively, all or a part of such functional entity may be actualized in the base station apparatus. An apparatus in which the functional entity is actualized may be the communication apparatus, for example. The node apparatus, the gateway apparatus, the server apparatus and further, the base station apparatus may be each example of the communication apparatus.

Further, for example, the functions performed in the OCS 420 and the L-OCS 620 may be performed in the PCRF 410 and the L-PCRF 610, respectively, or the functions performed in the PCRF 410 and the L-PCRF 610 may be performed in the OCS 420 and the L-OCS 620, respectively. For example, the function performed in each functional entity included in the two PCC 400, 600 may be actualized in another functional entity.

Further, as to the route of notification when the data usage allocated to the relevant user exceeds the upper limit value, the notification may be notified from the PCEF 320 through the OCS 420 to the PCRF 410, so that the new policy may be introduced. Alternatively, the notification may be performed from the PCEF 320 to the PCRF 410 and the OCS 420 in parallel. As to the L-PCEF 220, the notification may be notified through the OCS 420 to the PCRF 410, in one case, whereas may be notified from the L-PCEF 220 to the PCRF 410 and the OCS 420 in parallel in another case.

Furthermore, in the above-mentioned second embodiment, the description that the ICPT 230 is included in the eNB 200 has been given. For example, the ICPT 230 may be included in a communication apparatus connected to the eNB 200.

It is possible to provide a communication apparatus, a communication method, a communication system, and a node apparatus, capable of efficiently performing policy control and charging control in a mobile-edge computing environment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

10: Communication system
100: UE (Terminal apparatus)
107: CPU
200: eNB (Base station apparatus)
207: CPU
210: GW
220: L-PCEF/TDF
230: ICPT
300: PGW
320: PCEF/TDF
400: Core side PCC
401: CPU
410: PCRF
420: OCS
430: SPR
440: AF
500: Application server
600: Base station side PCC
601: CPU
610: L-PCRF
620: L-OCS
630: L-SPR
640: L-AF
700: SGW
800: MME

What is claimed is:

1. A communication control apparatus comprising:
a memory configured to store a plurality of programs; and
a processing unit coupled to the memory and configured to execute the plurality of programs to:
perform policy control and charging control to a first communication having a session between a terminal apparatus and a first gateway in a core network and/or a second communication as a local communication having a session between the terminal apparatus and a second gateway different from the first gateway based on both of a first communication amount in the first communication at the first gateway and a second communication amount in the second communication at the second gateway,
wherein the first communication includes a radio communication part between the terminal and a base station and a first branch part between the base station and the first gateway, and the second communication includes the radio communication part and a second branch part between the base station and the second gateway, and wherein the policy control and charging control to the first communication and/or the second communication includes dispensing or reservation of an available data amount of the first communication and the second communication not to exceed an upper limit value.

2. A communication system comprising:

a first gateway as a first communication apparatus in a core network, the first gateway configured to perform a first communication having a session with a terminal apparatus;

a second gateway as a second communication apparatus configured to perform a second communication as a local communication having a session with the terminal apparatus;

a third communication apparatus configured to monitor a first communication amount in the first communication at the first gateway and transmit information relating to monitoring result with respect to the first communication amount;

a fourth communication apparatus configured to monitor a second communication amount in the second communication at the second gatewav and transmit information relating to monitoring result with respect to the second communication amount; and a communication control apparatus configured to receive the information relating to monitoring result from the third communication apparatus and the fourth communication apparatus, and perform policy control and charging control to the first communication and/or the second communication based on both of the first communication amount and the second communication amount, wherein the first communication includes a radio communication part between the terminal and a base station and a first branch part between the base station and the first gateway, and the second communication includes the radio communication part and a second branch part between the base station and the second gateway, wherein the policy control and charging control to the first communication and/or the second communication includes dispensing or reservation of an available data amount of the first communication and the second communication not to exceed an upper limit value.

3. A communication control apparatus comprising:

a memory configured to store a plurality of programs; and a processing unit coupled to the memory and configured to execute the plurality of programs to:

perform policy control and charging control to a first communication having a session between a terminal apparatus and a first gateway in a core network and/or a second communication as a local communication having a session between the terminal apparatus and a second gateway different from the first gateway based on both of a first communication amount in the first communication at the first gateway and a second communication amount in the second communication at the second gateway, wherein the first communication includes a radio communication part between the terminal and a base station and a first branch part between the base station and the first gateway, and the second communication includes the radio communication part and a second branch part between the base station and the second gateway, and wherein the policy control and charging control to the first communication and/or the second communication includes changing a policy rule and/or a charging rule of the first communication and/or the second communication when a total value of the first communication amount and the second communication amount exceeds an upper limit value.

4. A communication system comprising:

a first gateway as a first communication apparatus in a core network, the first gateway configured to perform a first communication having a session with a terminal apparatus;

a second gateway as a second communication apparatus configured to perform a second communication as a local communication having a session with the terminal apparatus;

a third communication apparatus configured to monitor a first communication amount in the first communication at the first gateway and transmit information relating to monitoring result with respect to the first communication amount;

a fourth communication apparatus configured to monitor a second communication amount in the second communication at the second gateway and transmit information relating to monitoring result with respect to the second communication amount; and a communication control apparatus configured to receive the information relating to monitoring result from the third communication apparatus and the fourth communication apparatus, and perform policy control and charging control to the first communication and/or the second communication based on both of the first communication amount and the second communication amount, wherein the first communication includes a radio communication part between the terminal and a base station and a first branch part between the base station and the first communication apparatus, and the second communication includes the radio communication part and a second branch part between the base station and the second communication apparatus, wherein the policy control and charging control to the first communication and/or the second communication includes changing a policy rule and/or a charging rule of the first communication and/or the second communication when a total value of the first communication amount and the second communication amount exceeds an upper limit value.

* * * * *